(12) United States Patent
Yung et al.

(10) Patent No.: US 6,804,892 B1
(45) Date of Patent: Oct. 19, 2004

(54) ALIGNMENT DEVICE WITH MULTIPLE SPRING SYSTEMS

(75) Inventors: Bill Wai Lam Yung, Kowloon (HK); Jonathan Wing Cheung Lam, Kowloon Bay (HK); Weng Chia Tang, Fanling (HK)

(73) Assignee: Toolz, Ltd, Kowloon (HK)

( * ) Notice: Subject to any disclaimer, the term of this patent is extended or adjusted under 35 U.S.C. 154(b) by 0 days.

(21) Appl. No.: 10/402,329

(22) Filed: Mar. 28, 2003

(51) Int. Cl.$^7$ .............................................. G01C 15/00
(52) U.S. Cl. ........................................ 33/286; 33/227
(58) Field of Search ......................... 33/227, 290, 281, 33/282, 283, 284, 285, 286, 291, 276, 277, 278, DIG. 21

(56) References Cited

U.S. PATENT DOCUMENTS

| | | | |
|---|---|---|---|
| 3,279,070 A | | 10/1966 | Blount et al. |
| 3,612,700 A | * | 10/1971 | Nelson .......................... 33/286 |
| 3,631,601 A | * | 1/1972 | McNulty ....................... 33/228 |
| 3,663,111 A | * | 5/1972 | Tsuda et al. ................... 33/291 |
| 3,684,381 A | | 8/1972 | Zoot |
| 3,771,876 A | | 11/1973 | Ljungdahl et al. |
| 3,897,637 A | | 8/1975 | Genho |
| 4,031,629 A | | 6/1977 | Paluck |
| 4,221,483 A | | 9/1980 | Rando |
| 4,305,209 A | * | 12/1981 | Yamashita ................. 33/275 R |
| 4,751,782 A | | 6/1988 | Ammann |
| 4,852,265 A | | 8/1989 | Rando et al. |
| 4,907,881 A | * | 3/1990 | Jones ........................... 33/286 |
| 4,912,851 A | | 4/1990 | Rando et al. |
| 5,101,570 A | | 4/1992 | Shimura |
| 5,144,487 A | | 9/1992 | Hersey |
| 5,184,406 A | | 2/1993 | Swierski |
| 5,212,889 A | * | 5/1993 | Lysen ........................... 33/286 |
| 5,328,209 A | * | 7/1994 | Cromwell ....................... 285/1 |
| 5,400,514 A | * | 3/1995 | Imbrie et al. .................. 33/286 |
| 5,444,915 A | * | 8/1995 | Hedman ........................ 33/293 |
| 5,461,425 A | | 10/1995 | Fowler et al. |
| 5,485,266 A | | 1/1996 | Hirano et al. |
| 5,533,268 A | * | 7/1996 | Keightley ...................... 33/290 |
| 5,552,886 A | | 9/1996 | Kitajima et al. |
| 5,610,711 A | | 3/1997 | Rando |
| 5,619,802 A | | 4/1997 | Rando et al. |
| 5,636,018 A | | 6/1997 | Hirano et al. |
| 5,680,208 A | | 10/1997 | Butler et al. |
| 5,742,387 A | | 4/1998 | Ammann |
| 5,819,424 A | | 10/1998 | Ohtomo et al. |
| 5,847,820 A | | 12/1998 | Hamar |
| 5,903,345 A | | 5/1999 | Butler et al. |
| 5,960,551 A | | 10/1999 | Nishi et al. |
| 6,035,540 A | * | 3/2000 | Wu et al. ....................... 33/286 |
| 6,430,823 B1 | * | 8/2002 | Seki ............................. 33/281 |
| 6,568,094 B2 | * | 5/2003 | Wu ............................... 33/281 |

* cited by examiner

*Primary Examiner*—Diego Gutierrez
*Assistant Examiner*—Travis Reis
(74) *Attorney, Agent, or Firm*—Vierra Magen Marcus Harmon & DeNiro LLP

(57) ABSTRACT

An alignment device provides one or more references, such as laser lines and planes in horizontal and vertical orientations. One version of the alignment device includes an optics mounting assembly situated in a pivot socket on a frame to provide an output beam. Multiple spring systems and one or more alignment assemblies align and secure the optics mounting assembly in the socket. As a result, the output beam has a desired orientation with respect to true level. A first spring system directs the optics mounting assembly through the pivot socket. A second spring system holds the optics mounting assembly in communication with the alignment assemblies to reduce system backlash. One implementation of the pivot socket has a surface in the form of a sphere's interior surface. A set of support members on the optics mounting assembly rest on the pivot socket's spherical surface—causing the output reference beam to extend from the center of a sphere including the socket's spherical surface. This reduces the translation of the output reference beam's origin when the optics mounting assembly pivots in the socket.

94 Claims, 25 Drawing Sheets

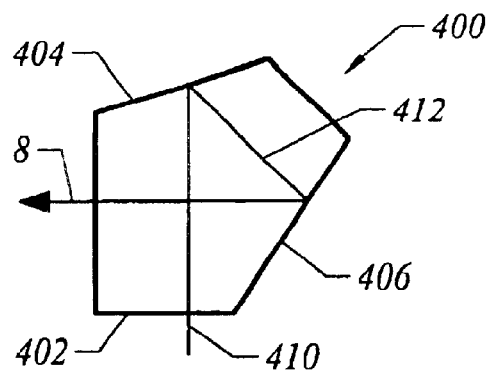
*FIG. 9*
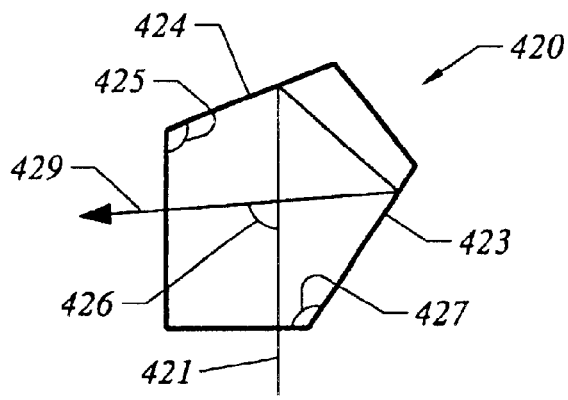
*FIG. 10A*
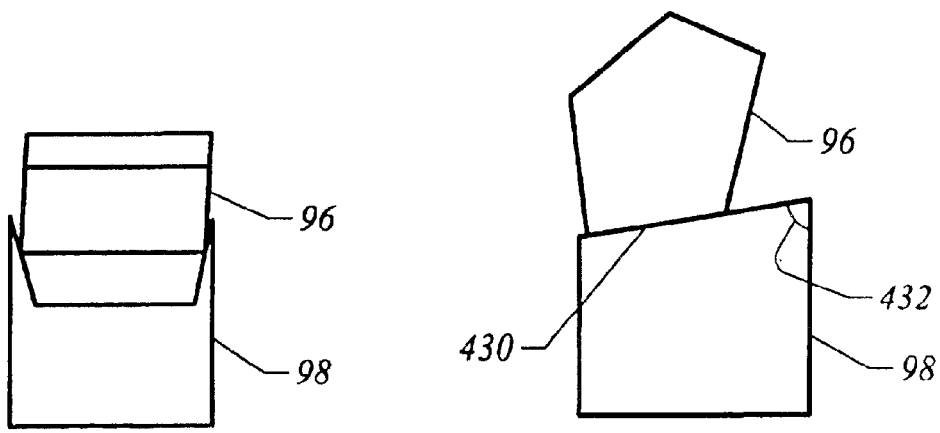
*FIG. 10B*          *FIG. 10C*

ALIGNMENT DEVICE WITH MULTIPLE SPRING SYSTEMS

CROSS-REFERENCE TO RELATED APPLICATIONS

This Application is related to the following applications:

U.S. patent application Ser. No. 09/928,244, entitled "Laser Alignment Device Providing Multiple References," filed on Aug. 10, 2001;

U.S. patent application Ser. No. 10/004,694, entitled "Servo-Controlled Automatic Level and Plumb Tool," filed on Dec. 4, 2001;

U.S. patent application Ser. No. 10/279,754, entitled "Alignment Device," filed on Oct. 24, 2002; and U.S. patent application Ser. No. 20040078989, entitled "Reflector Mounting in an Alignment Device," filed on Mar. 14, 2003.

This Application incorporates each of the above-identified applications herein by reference.

BACKGROUND OF THE INVENTION

1. Field of the Invention

The present invention is directed to the field of alignment devices.

2. Description of the Related Art

People undertaking construction and repair projects frequently require the use of reference guides. People employ reference guides on projects ranging from professional construction of large city buildings to amateur home improvement. For example, a person installing a border on the walls of a room requires a level reference line on each wall identifying a placement position for the border.

Traditional alignment tools for assisting in the manual placement of reference guides include straight edges, rulers, protractors, squares, levels, and plumb bobs. More recently, tool manufacturers have introduced laser alignment devices that provide references, such as points, lines, and planes. These laser alignment tools include, simple pointers, pointers with bubble vials, self-leveling pointers, multiple beam pointers, and devices producing a sheet of light.

In many instances a project requires the use of multiple references. For example, a project may require the use of both reference lines and planes in horizontal and vertical orientation. In many instances this requires the use of multiple alignment tools—forcing a person to have all of these tools available for the project. The purchase, maintenance, storage, and transportation of several alignment tools are undesirable inconveniences that consume time and money. In some circumstances it is simply impractical to have multiple alignment tools readily available on a job site.

It is desirable for a single alignment tool to provide multiple types of references in both horizontal and vertical orientations. This reduces the number of tools required for a job—allowing users the convenience of purchasing, maintaining, storing, and transporting a reduced number of tools. The user's convenience in using a multiple reference tool, however, must not be outweighed by the expense of the tool. The multiple reference alignment tool also needs to meet the user's accuracy expectations.

In electro-mechanical control systems, such as an automated reference tool, backlash can be a leading source of inaccuracy. In a control system, the movement of a first object directs the motion of a second object. Backlash is the phenomenon of mechanical hysteresis that occurs when the direction of motion of the first object is altered. Mechanisms controlling the motion of the second object by directing the motion of the first object need to account for backlash. Otherwise, the control system's accuracy will be compromised. A multiple reference alignment tool needs to either reduce or compensate for backlash in all of the orientations the tool will be used.

Traditional systems frequently employ expensive high precision components to overcome the problem of backlash and minimize other sources of inaccuracy. However, this can result in increasing the expense of a reference tool beyond the acceptable threshold of many users. It is desirable to reduce backlash effects and other inaccuracies without necessitating the use of expensive components.

SUMMARY OF THE INVENTION

The present invention, roughly described, pertains to an alignment device capable of providing multiple references in different orientations—reducing the number of alignment devices a user needs for a job site. One implementation of the alignment device provides a horizontal set of laser references and a vertical set of laser references. For each set of references, users have the ability to select a plane, line, or pointing reference. In one version of the alignment device, users can also rotate the position of the vertical and horizontal reference points and lines. In a further embodiment, users can adjust the positions of the laser planes on incident surfaces.

One embodiment of the alignment device includes an optics mounting assembly mounted in a pivot socket on a frame. Three spring systems and one or more alignment assemblies secure the optics mounting assembly in the pivot socket and provide for movement of the optics mounting assembly with reduced backlash. The optics mounting assembly includes a light source supplying a light beam. In one embodiment, the light source is a laser emitting diode supplying a laser beam. The source beam is incident on a reflector that produces an output reference beam. At rest, the reflector produces a reference point. A motor mounted on the optics mounting assembly spins the reflector to generate a reference plane. The motor dithers the reflector to generate a reference line. In a further embodiment, a user can manually position the output reference beam.

One implementation of the pivot socket has a surface in the form of a sphere's interior surface. The optics mounting assembly extends through the pivot socket and includes a set of support members that rest on the pivot socket's spherical surface. The support members hold the reflector in a position that results in the output reference beam originating at the center of a sphere that includes the pivot socket's spherical surface. This minimizes translation of the output reference beam's origin when the optics mounting assembly pivots in the socket.

A first spring system includes a set of springs exerting force on the optics mounting assembly. The spring forces hold the optics mounting assembly support arms against the spherical surface of the pivot socket—directing the optics mounting assembly through the pivot socket. In one implementation, a resultant force from the first spring system is directed along an axis that is perpendicular to a cross-section of an opening in the pivot socket that receives the optics mounting assembly. The optics mounting assembly includes a set of extension arms that communicate with the alignment assemblies. A second spring system biases the extension arms against the alignment assemblies. The alignment assemblies apply forces on the extension arms that oppose the force effects of gravity and extraneous impacts on the optics mounting assembly. The forces from the first spring system and alignment assemblies hold the optics mounting assembly in a desired position within the pivot socket. In one embodiment, the optics mounting assembly is always positioned so that movement of the optics mounting assembly is about a pivot point at the center of a sphere that includes the spherical surface of the socket.

Alignment assembly movements direct the movement of the optics mounting assembly—altering the position of the output reference beam. In one embodiment, the alignment device includes a level sensor that supplies signals indicating whether the optics mounting assembly is normal to true level. A control subsystem in the alignment device employs these signals to drive the alignment assemblies. The alignment assemblies provide forces to the optical mounting assembly extension arms—positioning the optics mounting assembly normal to true level. This results in an output reference beam parallel to true level. In one embodiment, the alignment assemblies pivot the optics mounting assembly about a pivot point at the center of a sphere that includes the spherical surface of the socket.

The first and second spring systems assist in removing backlash from the alignment device's controlled movement of the optics mounting assembly. The second spring system holds the extension arms flush against pads on the alignment assemblies. The optics mounting assembly support arms are held flush against the spherical surface of the pivot socket by the combined forces of gravity and the first spring system.

In one implementation, each alignment assembly pad is mounted on a lead screw with a gear driven by a motor controlled pinion. The pinion's teeth are tightly coupled to the gear's teeth to further reduce backlash. The pinion and gear are drawn together by a spring force from a third spring assembly that allows the gear and pinion teeth to separate, as needed, to minimize backlash and compensate for run-out.

The alignment device also produces an accurate reference beam when the device is rotated by ninety degrees—converting a horizontal laser plane generated by the reference beam into a vertical laser plane. The spring systems and alignment assemblies provide the same forces in the rotated orientation to secure the position of the optics mounting assembly and remove backlash effects. In such an implementation, the alignment assemblies can be employed to control the positioning of the output reference beam on an incident surface. For example, the alignment assemblies may horizontally translate a vertical laser plane output on the incident surface.

Further implementations of the alignment device include additional features for enhancing accuracy. For example, the reflector can be a penta-prism mounted with a predefined pitch for reducing the effects of satellite output beams. The penta-prism may also include a predetermined pitch deviation. The penta-prism is then mounted within a known roll range to achieve a more accurately positioned reference beam.

Alignment devices in alternate embodiments of the present invention may provide less than all of the references described above. One version of an alignment device according to the present invention only provides a single type of reference in a single orientation.

Aspects of the present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 9 shows a penta-prism used in one embodiment of the present invention as a reflector.

FIGS. 10A–10C shows alternate embodiments of a penta-prism and implementations for mounting a penta-prism.

DETAILED DESCRIPTION

I. External Operation

Figure 1:
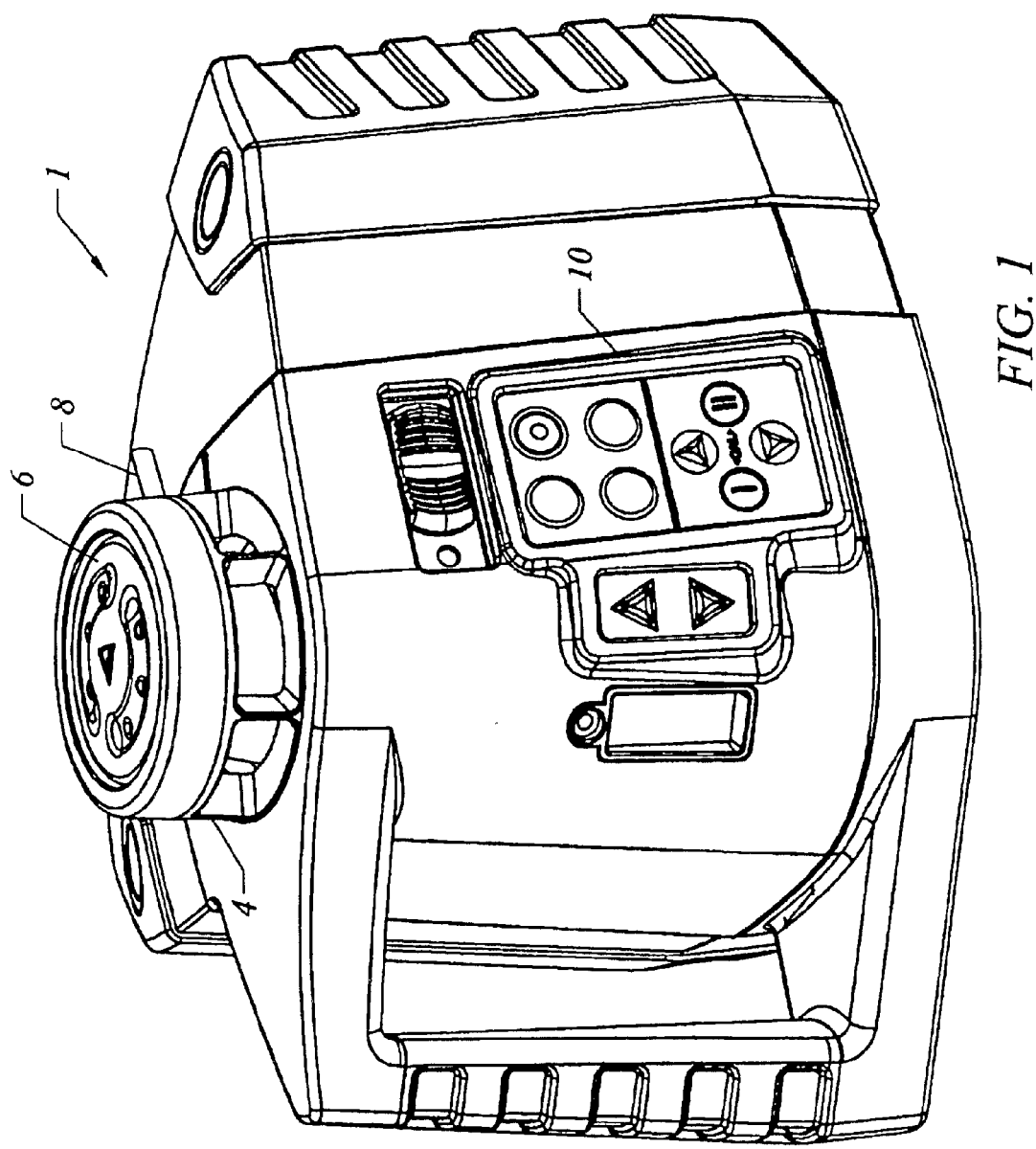
FIG. 1 depicts the exterior of an alignment device in one embodiment of the present invention.

FIG. 1 shows a laser alignment device 1 in accordance with the present invention. Output beam 8 emanates from beam turret 4, which is mounted on top of alignment device 1. In one embodiment, output beam 8 is a laser beam, while in alternate embodiments output beam 8 can be any type of light, including visible and invisible light. Alignment device 1 uses output beam 8 to provide reference points, lines, and planes on incident surfaces. In the orientation shown in FIG. 1, alignment device 1 provides horizontal reference lines and planes. When alignment device 1 is rotated by ninety degrees, output beam 8 provides vertical reference lines and planes. The rotated operation of alignment device 1 is described below in greater detail.

The position of output beam 8 can be rotated to adjust the position of a reference line or point. In one embodiment, a user manually rotates rotation cap 6 on turret 4 to make an angular adjustment to the position of a output beam 8. In an alternate embodiment, alignment device 1 automates the angular adjustment of output beam 8.

Local interface 10 on alignment device 1 includes control buttons that enable users to control the operation of alignment device 1. This allows users to generate and position horizontal and vertical references. In an alternate implementation, alignment device 1 includes a remote control receiver (not shown). The remote control receiver enables communication with a remote control, so a user can remotely direct the operation of alignment device 1. One skilled in the art will recognize that such a remote control receiver can support any one of a number of different communication mediums and protocols. For example, in one embodiment, the remote control receiver supports radio frequency communication, while in another embodiment the receiver support infrared signaling.

II. Internal Component Operation

A. Optics Alignment

FIGS. 2A–2I show one implementation of internal components for alignment device 1 in accordance with the present invention. FIGS. 2A–2I show different views as described above.

Figure 2A:
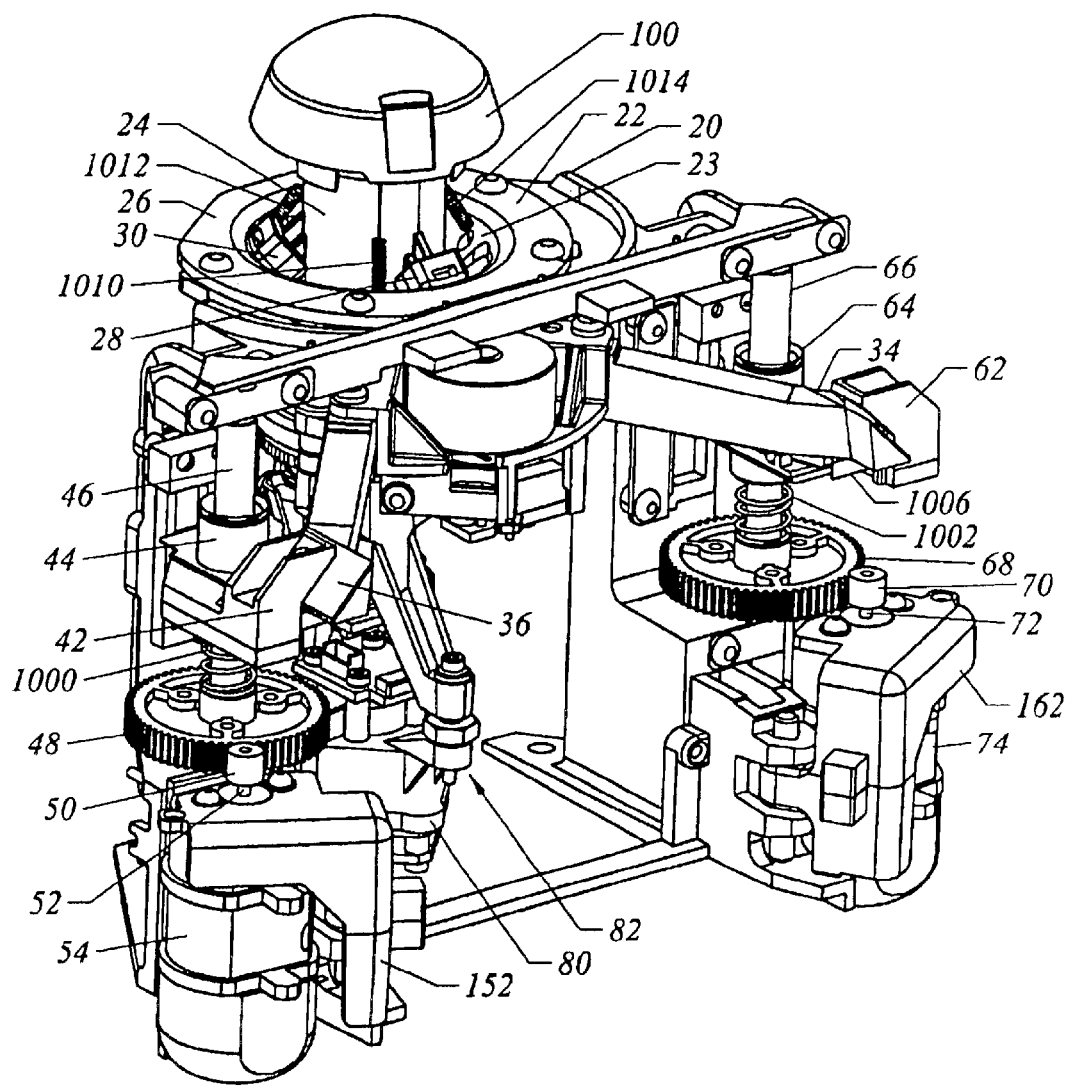
FIGS. 2A–2B show perspective views of internal components in one version of the alignment device in FIG. 1.
Figure 2B:
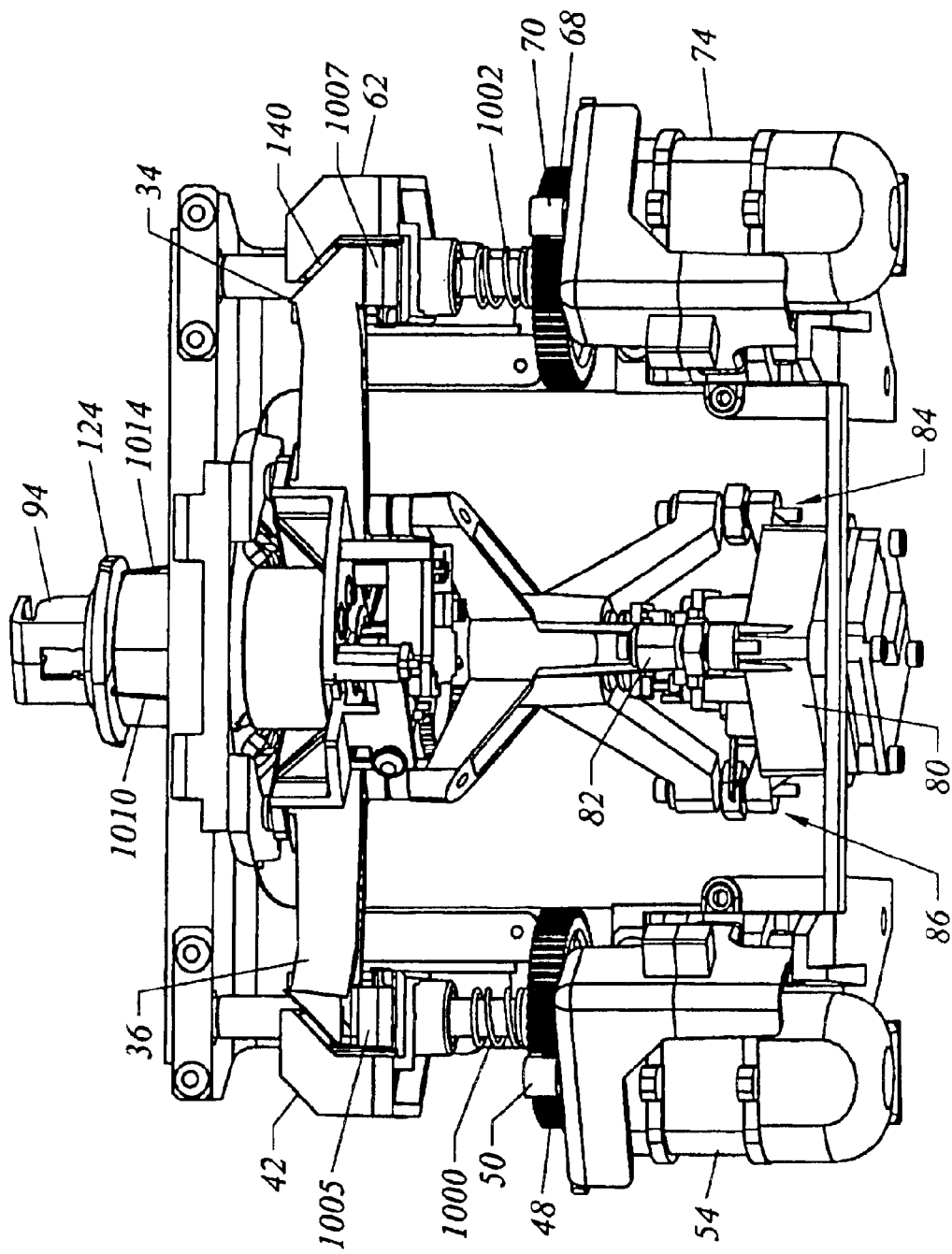
Figure 2C:
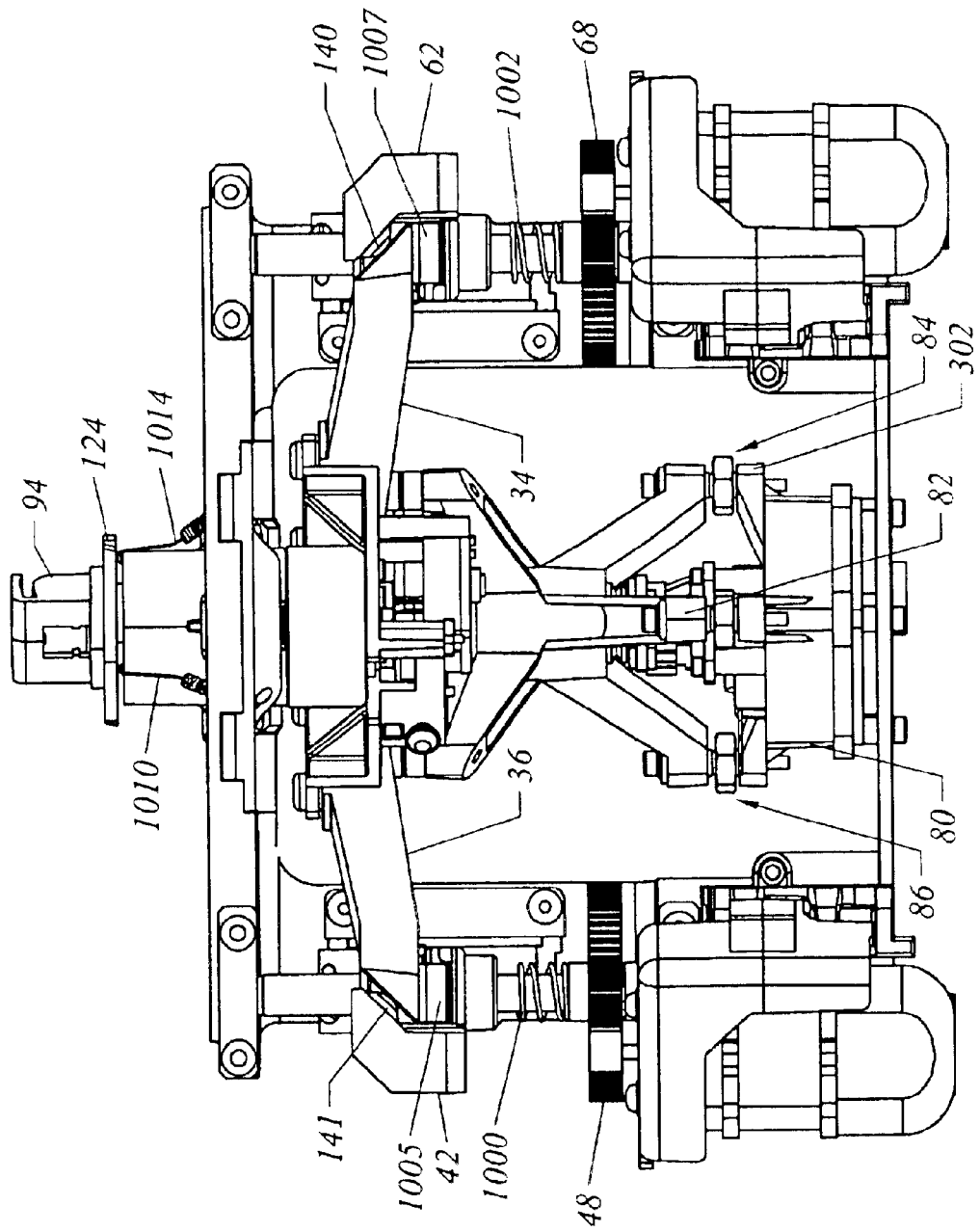
FIG. 2C shows a front view of internal components in one version of the alignment device in FIG. 1.
Figure 2D:
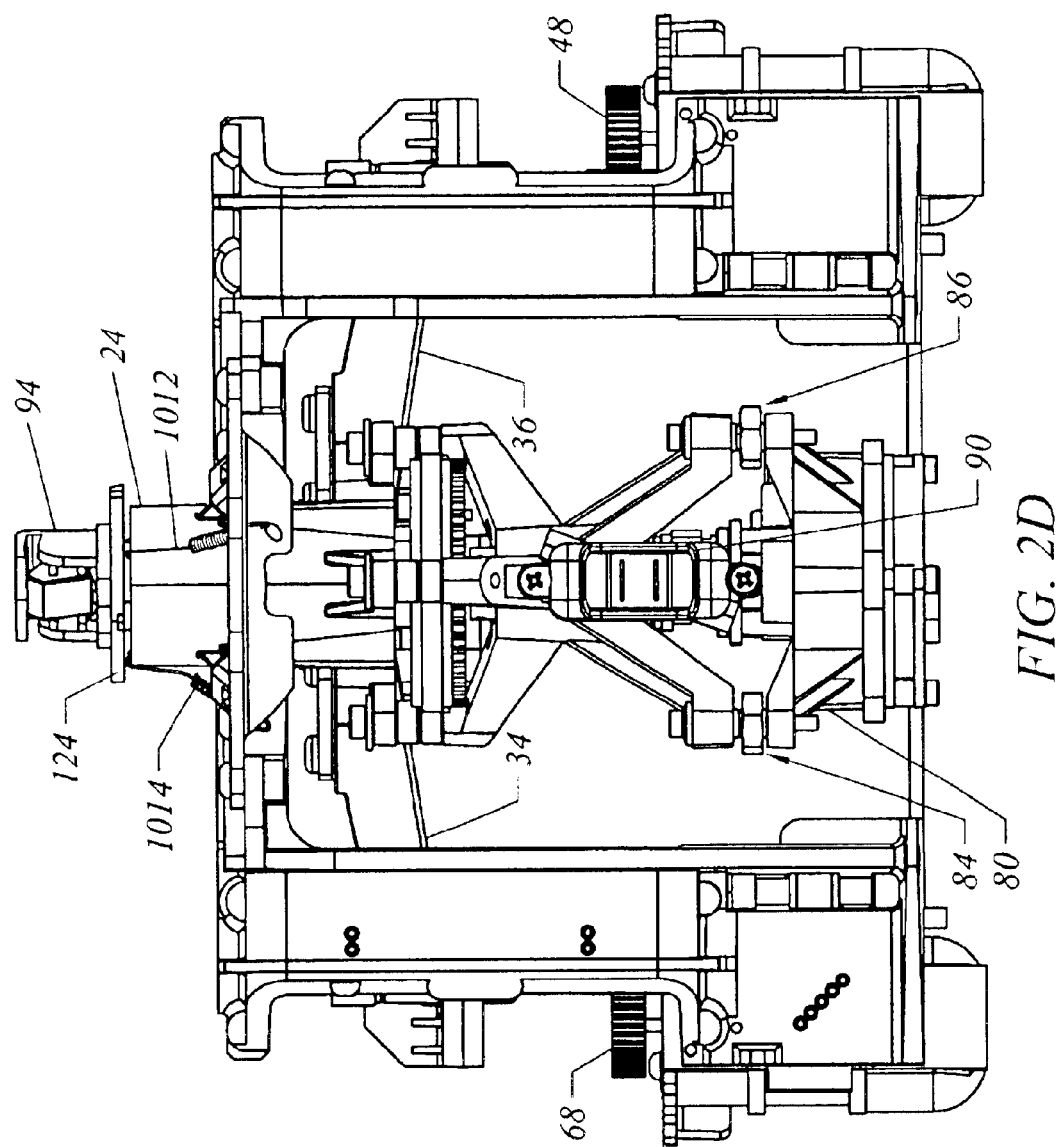
FIG. 2D shows a rear view of internal components in one version of the alignment device in FIG. 1.
Figure 2E:
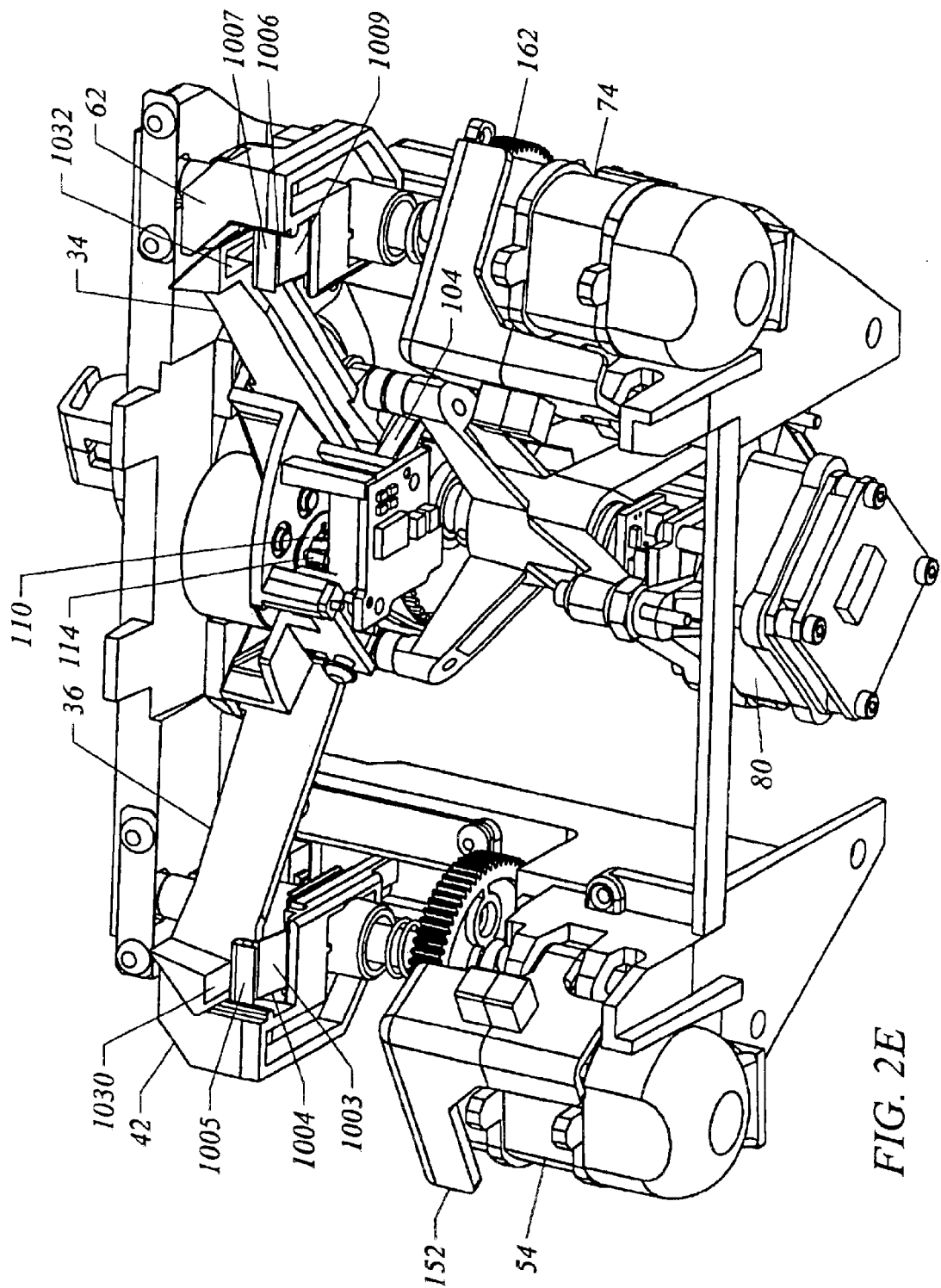
FIG. 2E shows a perspective bottom view of internal components in one version of the alignment device in FIG. 1.
Figure 2F:
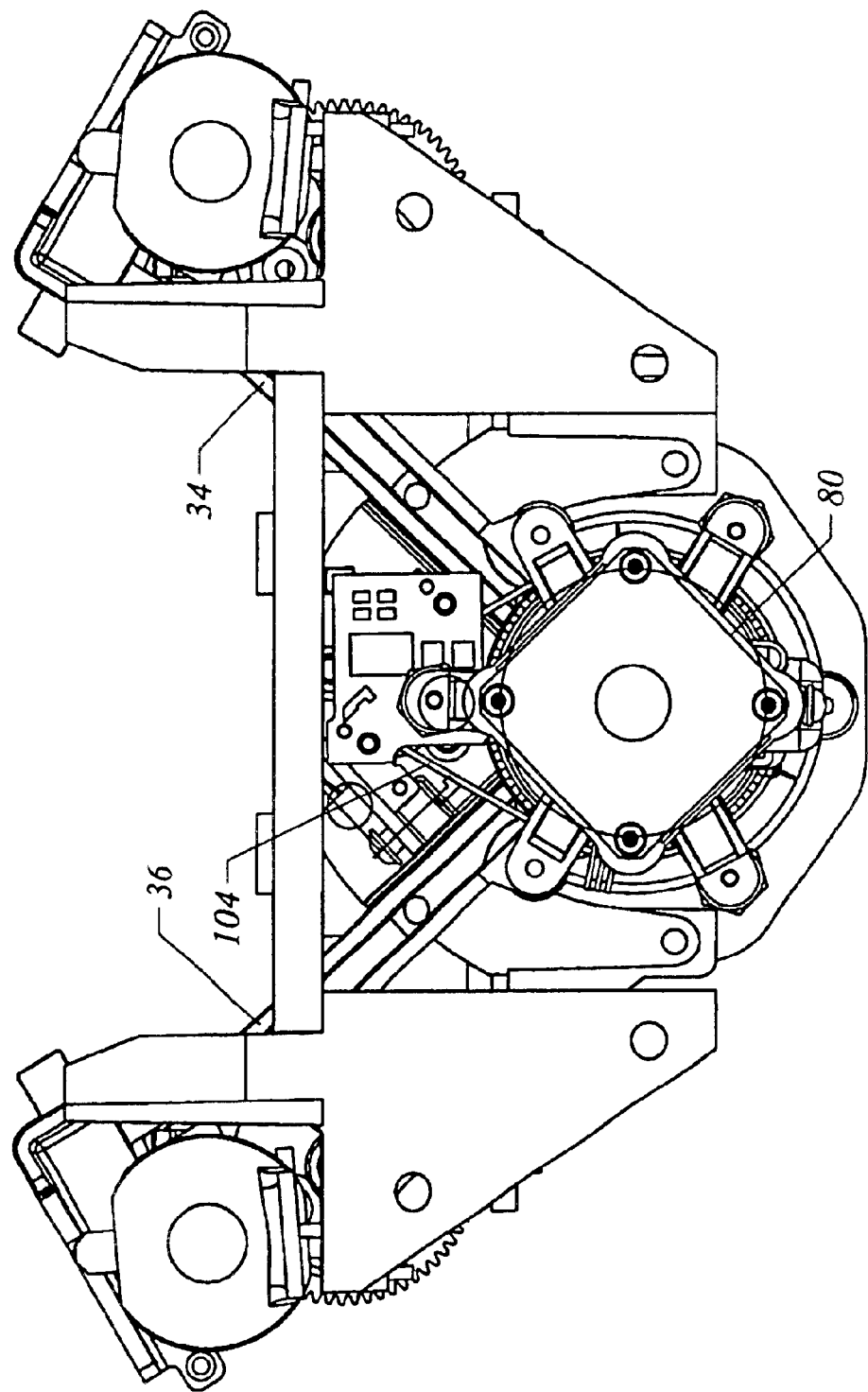
FIG. 2F shows a bottom view of internal components in one version of the alignment device in FIG. 1.
Figure 2G:
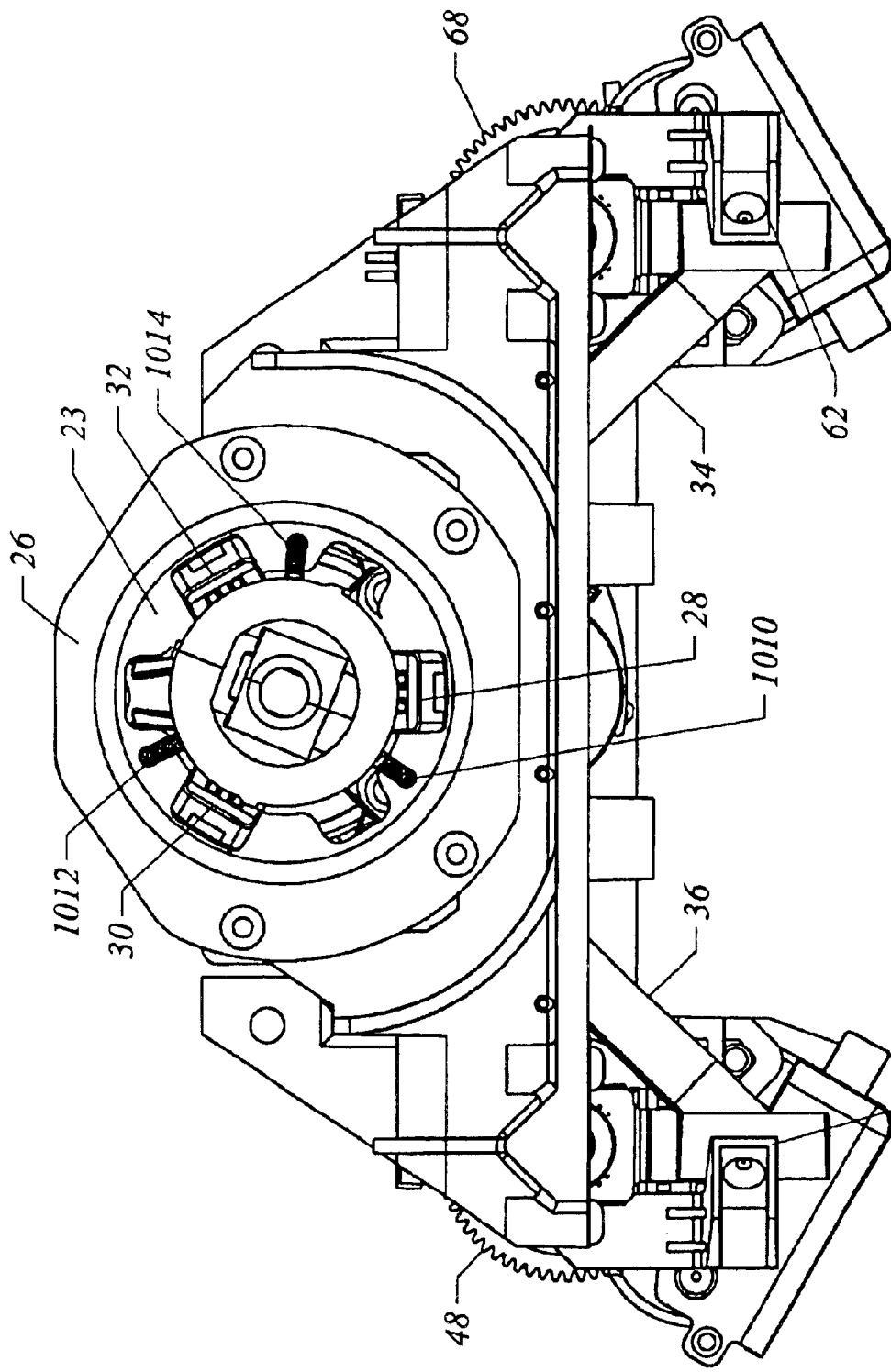
FIG. 2G shows a top view of internal components in one version of the alignment device in FIG. 1.
Figure 2H:
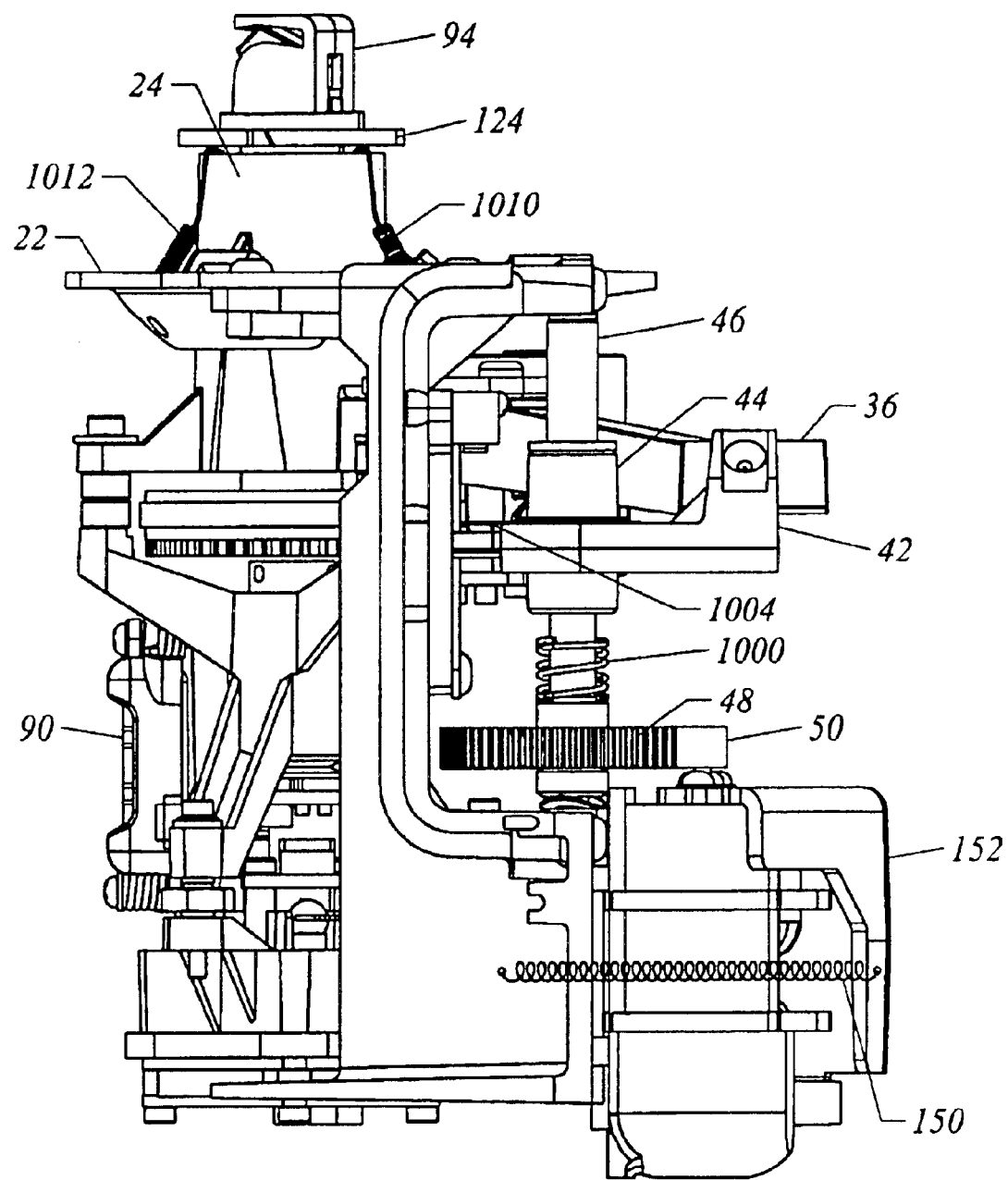
FIG. 2H shows a side view of internal components in one version of the alignment device in FIG. 1.
Figure 2I:
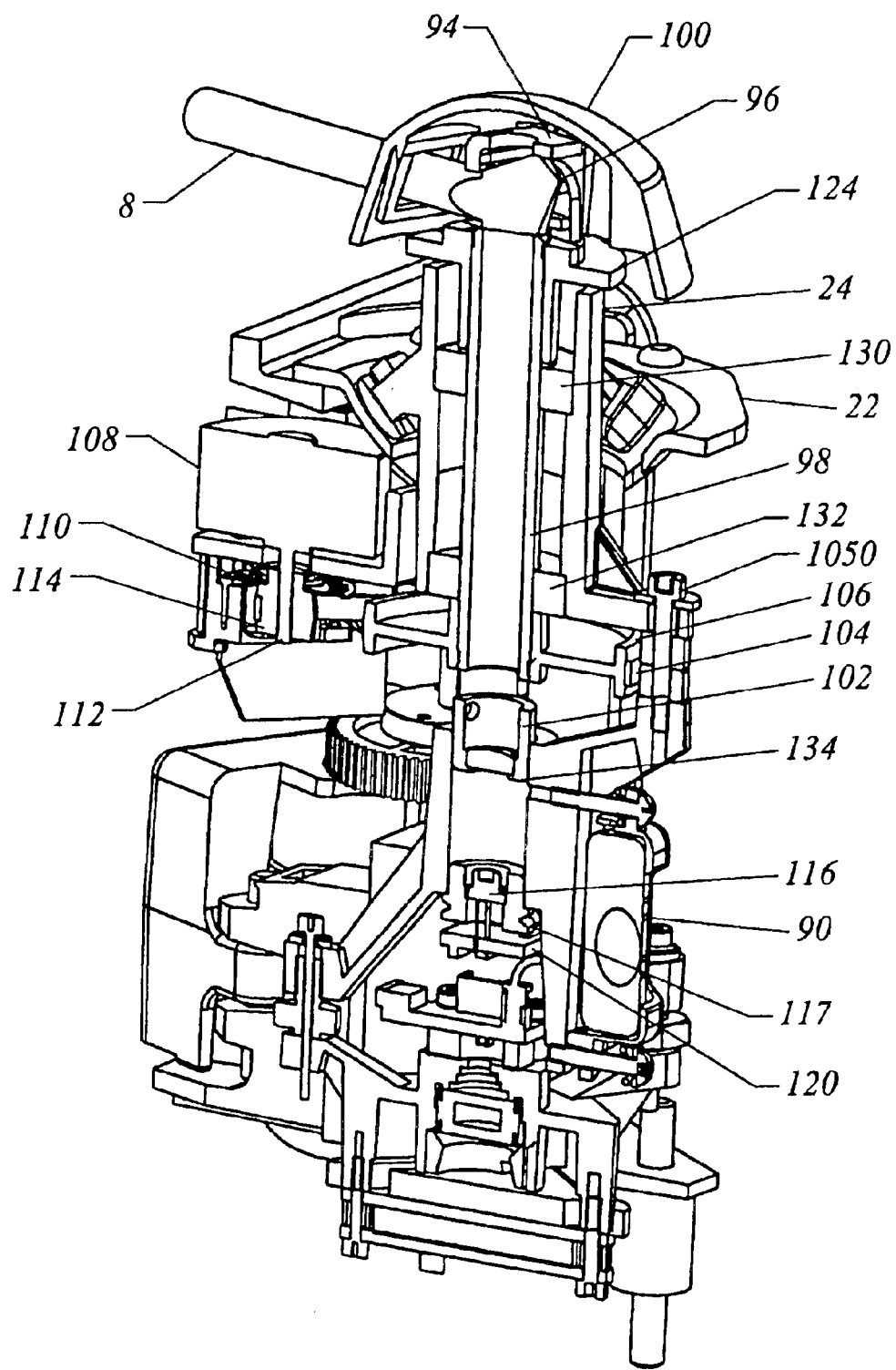
FIG. 2I shows a cross-sectional side view of internal components in one version of the alignment device in FIG. 1.

As shown in FIG. 2I, laser source 116 is mounted in mounting device 117, which is press fit into the hollow main shaft of optics mounting assembly 24. In one embodiment, laser source 116 is a laser emitting diode coupled to circuit board 120, and mounting device 117 is a mounting joint, as described in U.S. patent application Ser. No. 09/928,244. Collimating lens 134 is mounted in mount fixture 102, which is fitted into the main shaft of optics mounting assembly 24 in line with laser source 116.

Optics mounting assembly 24 houses hollow rotation shaft 98, which extends through guide bearings 130 and 132. Screw-spacer assemblies on the exterior of optics mounting assembly 24, such as screw-spacer assembly 1050, align rotation shaft 98 in line with collimating lens 134. Shaft 98 supports reflector 96 in line with lens 134 and laser source 116. A laser beam from source 116 extends through lens 134 and onto reflector 96, which converts the beam from source 116 into output beam 8.

Pulley 106 receives shaft 98. Motor 108 on optics mounting assembly 24 drives the rotation of pulley 106 to rotate shaft 98. Shaft 112 from motor 108 is coupled to belt drive pulley 114. Belt 104 extends around pulley 106 and pulley 114. In operation, motor 108 rotates shaft 112, which rotates pulley 114. The rotation of pulley 114 drives belt 104 to rotate pulley 106—resulting in the rotation of output beam 8. As will be described in more detail below, a control subsystem in alignment device 1 employs motor 108 to perform the following operations: 1) spinning reflector 96 to generate a laser plane reference; 2) dithering reflector 96 to generate a partial laser plane reference; and 3) adjusting the rotation of reflector 96 to position a laser reference point. Encoder 110 is mounted on shaft 112 to facilitate dithering and pointing. In an alternate embodiment, pulley 106 is formed with an embedded encoder that replaces encoder 110 and performs the below-described operation of encoder 110.

Alignment device 1 sets and secures the position of optics mounting assembly 24, so that output beam 8 has a desired orientation with respect to true level. In one embodiment, alignment device 1 provides for optics mounting assembly 24 to produce output beam 8 as parallel to true level. In further embodiments, alignment device 1 stabilizes optics mounting assembly 24 to have a predetermined offset from true level.

Looking at FIGS. 2A and 2B, optics mounting assembly 24 extends through pivot socket 22 on frame 20. Optics mounting assembly 24 includes support members 28, 30, and 32 (FIG. 2G) resting on section 23 of pivot socket 22. Section 23 is formed in the shape of a section from an interior surface of a sphere. Spherical section 23 extends downward from rim 26 on socket 22, which is used to mount socket 22 to frame 20. In an alternate embodiment, pivot socket 22 is formed in housing 20. Alignment device 1 adjusts the position of optics mounting assembly 24 within pivot socket 22 to give output beam 8 a desired orientation, such as parallel to true level.

In one implementation, members 28, 30, and 32 support optics mounting assembly 24, so that output beam 8 originates from reflector 96 at a point in the center of a sphere including spherical section 23. This center point also serves as the pivot point for assembly 24. This eliminates translation of the output beam origin when alignment device 1 adjusts the position of optics mounting assembly 24 within pivot socket 24. In alternate embodiments, the origin of output beam 8 may deviate from the sphere center point. In further embodiments, section 23 can have a non-spherical surface.

Optics mounting assembly 24 includes extension arms 34 and 36. As will be described below, forces applied to extension arms 34 and 36 assist in adjusting the orientation of optics mounting assembly 24. In one implementation, extension arms 34 and 36 extend from the center of optics mounting assembly 24 perpendicular to each other.

Alignment assemblies within alignment device 1 provide adjustment forces to extension arms 34 and 36. An alignment assembly in communication with extension arm 36 includes motor 54, which rotates shaft 52. Pinion 50 is mounted on shaft 52 and has teeth in communication with teeth on gear 48. Lead screw 46 is mounted to gear 48, so that screw 46 rotates when gear 48 rotates. Lead screw 46 extends through lead nut 44, so that lead nut 44 translates along lead screw 46, based on the direction that screw 46 rotates. Alignment force pad 42 is coupled to nut 44, so that pad 42 follows the translation path of nut 44. In one embodiment, pad 42 includes interface contact 141 to communicate with extension arm 36. (See FIG. 2C.) In one such embodiment, contact 141 has a spherical surface that enhances the ability of pad 42 to move extension arm 36 without binding. In a further embodiment, lead nut 44 includes pad 42 as an integral part, or the two elements are joined together in a different manner.

In one implementation, lead screw 46 is not threaded all the way down to gear 48. This can result in threads on lead nut 44 disengaging from threads on lead screw 46 when lead nut 44 is translated below the end of the threads on lead screw 46. The alignment assembly includes spring 1000 extending upward from gear 48. As lead nut 44 translates down lead screw 46, lead nut 44 comes into communication with spring 1000. Spring 1000 applies a force that enables lead nut 44 to reengage with the threads on lead screw 46.

In one implementation, the teeth of pinion 50 are tightly interlocked with the teeth of gear 48 to reduce backlash in the operation of the alignment assembly. As seen in FIG. 2H, gear 48 and pinion 50 are held in communication by spring 150—reducing backlash and compensating for run-out. Spring 50 reduces backlash by pulling the teeth of gear 48 and pinion 50 tightly together in operation. Spring 50 also reduces run-out. In this implementation, motor mount 152 supports motor 54. Motor mount 152 is mounted to frame 20 so that mount 152 can pivot pinion 50 away from and toward gear 48. Spring 150 is coupled to motor mount 152 and frame 20 to facilitate the above-described operation between the teeth of gear 48 and pinion 50.

An alignment assembly in communication with extension arm 34 includes motor 74, which rotates shaft 72. Pinion 70 is mounted on shaft 72 and has teeth in communication with teeth on gear 68. Lead screw 66 is mounted to gear 68, so that screw 66 rotates when gear 68 rotates. Lead screw 66 extends through lead nut 64, so that lead nut 64 translates along lead screw 66, based on the direction that screw 66 rotates. Alignment force pad 62 is coupled to nut 64, so that pad 62 follows the translation path of nut 64. In one embodiment, pad 62 includes interface contact 140 to communicate with extension arm 34. In one such embodiment, contact 140 has a spherical surface that enhances the ability of pad 62 to move extension arm 34 without binding. In a further embodiment, lead nut 64 includes pad 62 as an integral part, or the two elements are joined together in a different manner.

In one implementation, lead screw 66 is not threaded all the way down to gear 68. This can result in threads on lead nut 64 disengaging from threads on lead screw 66 when lead nut 64 is translated below the end of the threads on lead screw 66. The alignment assembly includes spring 1002 extending upward from gear 68. As lead nut 64 translates down lead screw 66, lead nut 64 comes into communication with spring 1002. Spring 1002 applies a force that enables lead nut 64 to reengage with the threads on lead screw 66.

In one implementation, the teeth of pinion 70 are tightly interlocked with the teeth of gear 68 to reduce backlash in the operation of the alignment assembly. Gear 68 and pinion 70 are also held in communication by a backlash reduction spring (not shown, but operating like spring 150) to reduce backlash and compensate for run-out. The backlash reduction spring reduces backlash by pulling the teeth of gear 68 and pinion 70 tightly together in operation. The backlash reduction spring also reduces run-out effects. In this implementation, motor mount 162 supports motor 74. Motor mount 162 is mounted to frame 20 so that mount 162 can pivot pinion 70 away from and toward gear 68. The backlash reduction spring is coupled to motor mount 162 and frame 20 to facilitate the above-described operation between the teeth of gear 68 and pinion 70.

A first spring system in alignment device 1 directs optics mounting assembly 24 through pivot socket 22—providing a resultant force along an axis that extends through an opening in pivot socket 22 that receives optics mounting assembly 24. In one embodiment, the first spring system consists of three springs. In alternate embodiments, more or less than three springs are employed in the first spring system.

As seen in FIGS. 2A–2C, the first spring system includes springs 1010, 1012, and 1014 in one implementation. Springs 1010, 1012, and 1014 each have a first end mounted to optics mounting assembly 24 and a second end mounted to pivot socket 22. In one implementation, springs 1010, 1012, and 1014 are mounted to spherical surface 23 on pivot socket 22. Optical mounting assembly 24 includes a lip for receiving hooks on springs 1010, 1012, and 1014 and spherical surface 23 includes openings for receiving hooks on springs 1010, 1012, and 1014. In other embodiments, springs 1010, 1012, and 1014 can include mounting mechanisms other than hooks, and the springs can be mounted at different locations.

Springs 1010, 1012, and 1014 each supply a force pulling support members 28, 30, and 32 against spherical section 23 of pivot socket 22. The forces from the first spring system secure optics mounting assembly 24 in pivot socket 22 so that optics mounting assembly 24 can be rotated about a pivot point at the center of a sphere including spherical section 23. Translation of lead nuts 44 and 64 control the movement of extension arms 34 and 36, respectively, to drive the rotation of optics mounting assembly 24 about this pivot point.

In one embodiment, springs 1010, 1012, and 1014 each provide a component force directed along an axis that extends through an opening in pivot socket 22 that receives optics mounting assembly 24. In one example, the axis is perpendicular to the cross section of the opening. Springs 1010, 1012, and 1014 also each provide a force that pulls optics mounting assembly 24 toward the edge of the opening in pivot socket 22. Springs 1010, 1012, are 1014 are equally spaced around the perimeter of the opening in pivot socket 22 and apply equal forces. Springs 1010, 1012, and 1014 have a spring constant of 0.3 Newtons per millimeter in one embodiment. In one implementation, springs 1010, 1012, and 1014 are constant force springs.

A second spring system provides forces that bias extension arms 36 and 34 against pads 42 and 62, respectively. The forces from pads 62 and 42 on extension arms 34 and 36, respectively, oppose the force effects of gravity and extraneous impacts to hold optics mounting assembly 24 in place. The translation of the lead nuts that include pads 62 and 42 positions optics mounting assembly 24. When lead nut 44 translates toward gear 48, the top of optics mounting assembly 24 rotates toward lead nut 44 about the pivot point at the center of a sphere including spherical surface 23. When lead nut 44 translates away from gear 48, the top of optics mounting assembly 24 rotates away from lead nut 44 about the pivot point at the center of a sphere including spherical surface 23. When lead nut 64 translates toward gear 68, the top of optics mounting assembly 24 rotates toward lead nut 64 about the pivot point at the center of a sphere including spherical surface 23. When lead nut 64 translates away from gear 48, the top of optics mounting assembly 24 rotates away from lead nut 64 about the pivot point at the center of a sphere including spherical surface 23.

As shown in FIGS. 2A–2C, 2E, and 2J, the second spring system consists of springs 1004 and 1006 in one embodiment—a spring is associated with each extension arm. In alternate embodiments, more or less springs can be employed. Spring 1004 is mounted on lead nut 42, and spring 1006 is mounted to lead nut 64. Springs 1004 and 1006 are leaf springs formed from a flexible metal, such as sheet metal.

In one implementation, spring 1004 has edge 1005 extending upward from base 1003 to contact extension arm 36. Spring edge 1005 applies a force to extension arm 36 that causes extension arm 36 to abut spherical contact 141 on pad 42. The surface of extension arm 36 that is in contact with edge 1005 has hollow section 1030. Section 1030 reduces resistance when extension arm 36 slides along edge 1005. In alternate embodiments, extension arm 36 does not include hollow section 1030. Other mechanisms can be employed for reducing friction between arm 36 and spring edge 1005.

In one embodiment, spring 1006 has edge 1007 extending upward from base 1009 to contact extension arm 34. Spring edge 1007 applies a force to extension arm 34 that causes extension arm 34 to abut spherical contact 140 on pad 62. The surface of extension arm 34 that is in contact with edge 1007 has hollow section 1032. Section 1032 reduces resistance when extension arm 34 slides along edge 1007. In alternate embodiments, extension arm 34 does not include hollow section 1032. Other mechanisms can be employed for reducing friction between arm 34 and spring edge 1007.

Figure 2J:
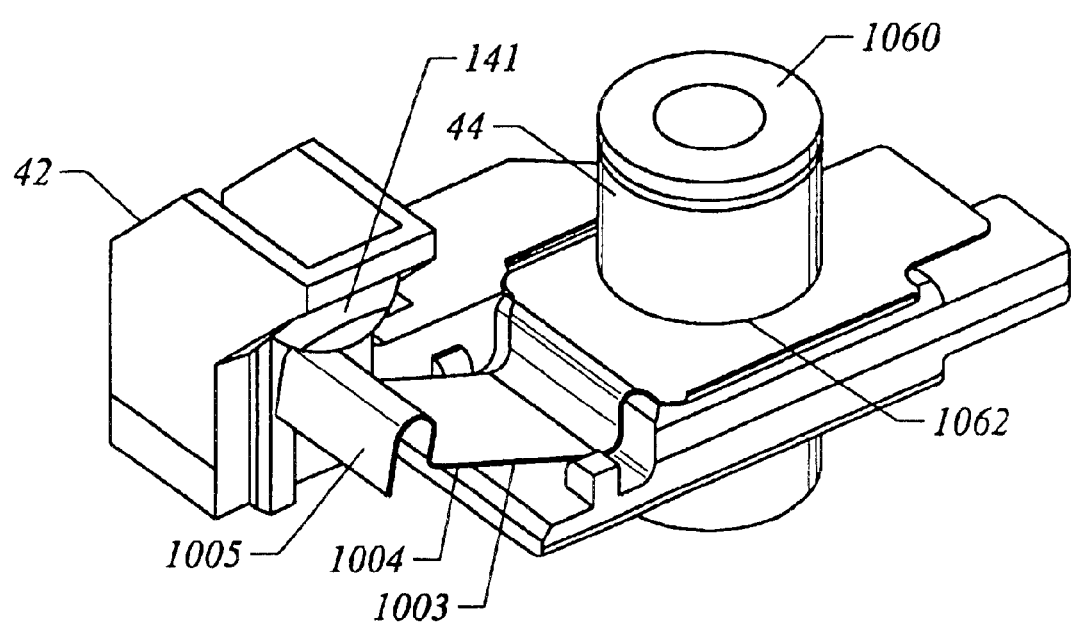
FIG. 2J shows a view of a lead nut in the alignment device including a spring.

FIG. 2J shows one implementation for mounting spring 1004 on lead nut 44. Spring 1004 includes opening 1062 in base 1003 that fits over lead nut 44. In one embodiment, opening 1062 includes teeth that grip lead nut 44 to hold spring 1004 in place. Insert 1060 is molded into lead nut 44 and includes internal threads (not shown) for receiving lead screw 46. In alternate embodiments, different or additional mechanisms can be employed to secure spring 1004. For example, spring 1004 can include an extension that crimps around a portion of lead nut 44. Also shown in FIG. 2J, edge 1005 on spring 1004 has a U-shaped bend that leads into base 1003, which bends to conform to the surface of lead nut 44. Edge 1005 and base 1003 can be formed differently in alternate embodiments. Some embodiments of spring 1004 may not include edge 1005. The implementation described above for mounting spring 1005 on lead nut 44 is also employed for mounting spring 1006 to lead nut 64.

In alternate implementations, springs 1004 and 1006 have different shapes and can be springs other than leaf springs. Springs 1004 and 1006 are also mounted in different manners in different variations of the invention. Alternate versions of springs 1004 and 1006 can be made from different materials.

The forces from the first spring system ensure that support members 28, 30, and 32 are flush against spherical surface 23. The forces from the second spring structure ensure that extension arms 36 and 34 are flush against pads 42 and 62, respectively. This operation of the second spring system reduces backlash in the positioning of optics mounting assembly 24. In operation, a control subsystem in alignment device 1 adjusts the position of output beam 8 by using the alignment assemblies to adjust the position of optics mounting assembly 24. The lag time between driving motors 54 and 74 and effecting motion on extension arms 34 and 35 is minimized, because pads 62 and 42 are in constant contact with arms 34 and 36, respectively.

In a further implementation, extension arms 34 and 36 are replaced by a pair of fine leads that rest on the grooves in lead screws 46 and 66. Like arms 34 and 36, the fine leads are perpendicular to each other. Rotating screws 46 and 66 causes the fine leads to slide up or down screws 46 and 66, based on the direction of rotation—causing the position of optics mounting assembly 24 in pivot socket 22 to be adjusted. The fine lead embodiment also reduces backlash effects, since the leads rest directly on the grooves in screws 46 and 66. In one embodiment, the fine leads are cylindrical and rigid with the dimensions of standard piano wire. In one example, the fine lead diameter is 1 millimeter or less.

Using the fine leads enables lead screws 66 and 46 to be driven directly by a motor, without the need for a gear and pinion mechanism. Screws 66 and 46 can be machined with very fine threads to allow for alignment adjustments with fine granularity. The fine screw threads do not create a need for expensive fine thread nuts, since lead nuts 44 and 64 and pads 42 and 62 are no longer needed.

In another embodiment, a surface on either arm 34 or arm 36 that contacts pad 62 or pad 42 has a groove (not shown). The groove receives the respective spherical contact 140 or 141. The groove eliminates rotation of the contact (140 or 141) on the arm (34 or 36). This ensures that arms 34 and 36 move along the desired path in response to alignment assembly forces.

In yet another embodiment of the present invention, optics mounting assembly 24 is replaced by a pendulum assembly that supports the above-described optical elements, including a motor for rotating reflector 96. In one such embodiment, the pendulum base includes shafts that support one or more balancing weights. The alignment assemblies are modified to slide the weights along the pendulum base shafts to adjust the pendulum's center of gravity. These adjustments modify the position of output beam 8.

B. Level Sensor

One version of alignment device 1 also has the capability to self-level—automatically bringing output beam 8 into a parallel relationship with true level. As shown in FIGS. 2A–2I, level sensor 80 is mounted to optics mounting assembly 24 to determine whether the central axis of assembly 24 is normal to true level. Level sensor 80 provides level indicators to a control subsystem in alignment device 1. In response to the level indicators, the control subsystem drives motors 54 and 74 to bring optics mounting assembly 24 into a perpendicular relationship with true level. Example embodiments of level sensor 80 are disclosed in U.S. patent application Ser. No. 10/004,694.

Figure 3:
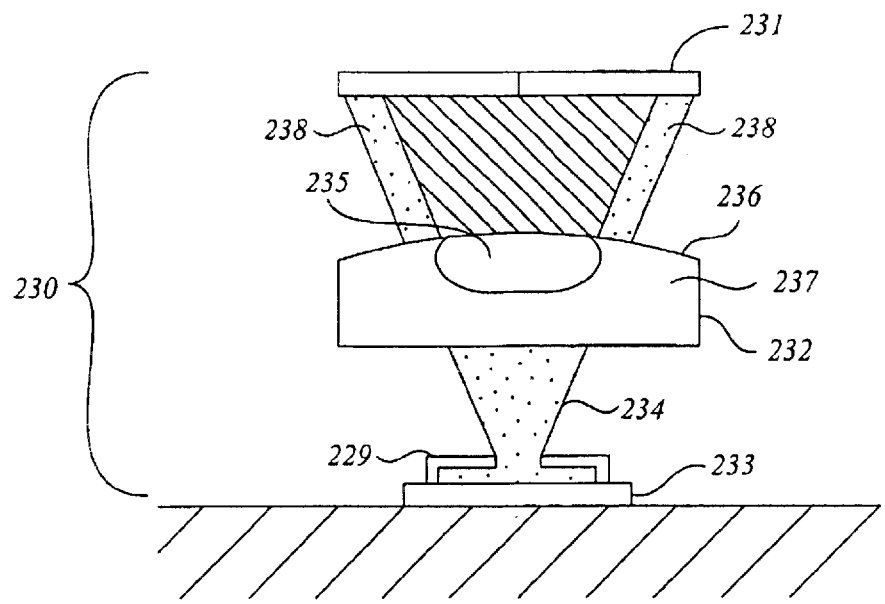
FIG. 3 is a side-section view of one implementation of a dual axis level sensor.

FIGS. 3–7 show various implementation of level sensor 80. FIG. 3 shows detector element 230 in level sensor 80, including position sensitive photo sensor 231, two-axis bubble level 232, aperture structure 229, and detector light source 233 for generating detector light beam 234 (also referred to as detector light). Detector light 234 is passed through bubble level 232 onto position sensitive photo sensor 231, which detects whether bubble level 232 is leveled. Since the illustrated embodiment is tiltable in two degrees of freedom, a detector (e.g. bubble level) that is sensitive to tilting in two degrees of freedom is particularly appropriate. In other embodiments, an angled pair of one-dimensional tilt detectors may be used. It is to be noted that other embodiments of detector elements can be used in accordance with the principles of the present invention.

When bubble 235 is centered in level 232, the output beams are level. As bubble level 232 is tilted, bubble 235 moves from a centered position. This alters the position and amount of light 238 being detected by position sensitive photo sensor 231. In order to more quickly center bubble 235, bubble level 232 can include a curved bubble face 236. In one embodiment, curved bubble face 236 has a radius of curvature of 70 millimeters. Position sensitive photo sensor 231 can incorporate any of a number of commercially available position sensitive detectors sensitive to detector light 234. Examples include, but are not limited to, quadrature detectors, charged coupled device (CCD) detectors, complementary metal oxide semiconductor (CMOS) image sensors (such as that taught in U.S. Pat. No. 5,461,425 to Fowler, et al. hereby incorporated by reference).

Figure 4:
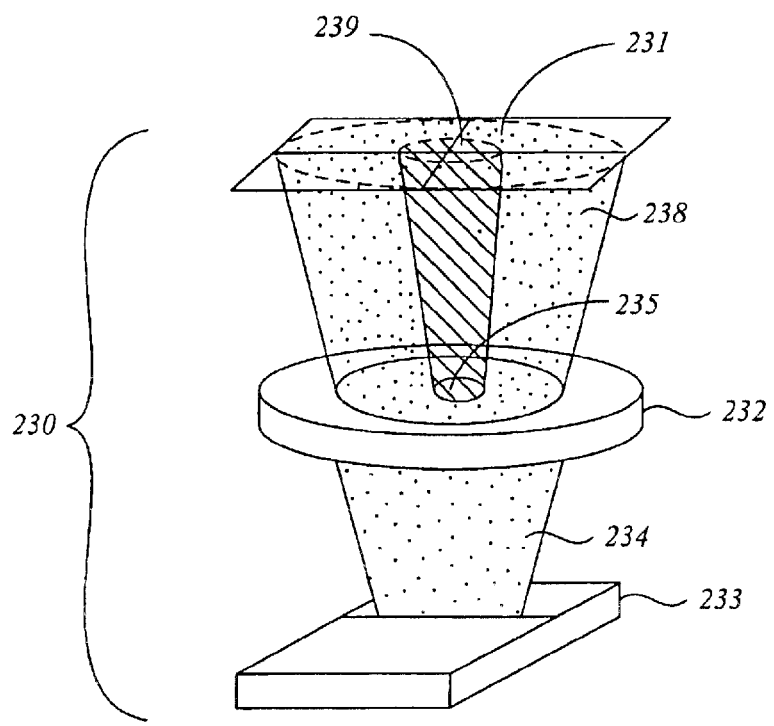
FIG. 4 is a perspective view of an implementation of a dual axis level sensor.

FIG. 4 is a perspective view of an embodiment of a two-axis detector element 230 in accordance with the principles of the present invention. Light source 233 generates a beam that passes through aperture 229 (See FIG. 3) to produce detector light beam 234 that is directed through two-axis bubble level 232 onto quadrature detector 231. Detector light 234 passes readily through fluid 237 but is refracted in large part by bubble 235 of two-axis bubble level 232. Consequently, detector light 234 forms ring of light 238 surrounding dark spot 239. In some embodiments, a torus shadow is cast by bubble 235. Ring 238 and spot 239 track the movement of bubble 235 as detector element 230 (and by consequence the output beams) is tilted. When dark spot 239 is centered in the middle of quadrature detector 231, output beam 8 is level. Therefore, when dark spot 239 is not centered on quadrature detector 231, adjustments are made to the alignment of optics mounting assembly 24 until dark spot 239 is centered. In alternate embodiments, bubble 235 is replaced by another object to cast ring 238 and spot 239. When bubble 235 is replaced by an object with a different shape, the shapes of ring 238 and spot 239 change accordingly.

Adjustments are accomplished by selective activation of the alignment assemblies, until dark spot 239 is centered. This is accomplished via a control subsystem in device 1 that adjusts the position of optical mounting assembly 24 in response to information received from quadrature detector 231. Bubble detector embodiments can be constructed such that the inside walls of the bubble container are not easily wetted by the fluids contained therein. In one example, the fluid can be water and the inside surface of the bubble container can be treated with hydrophobic material.

Figure 5:
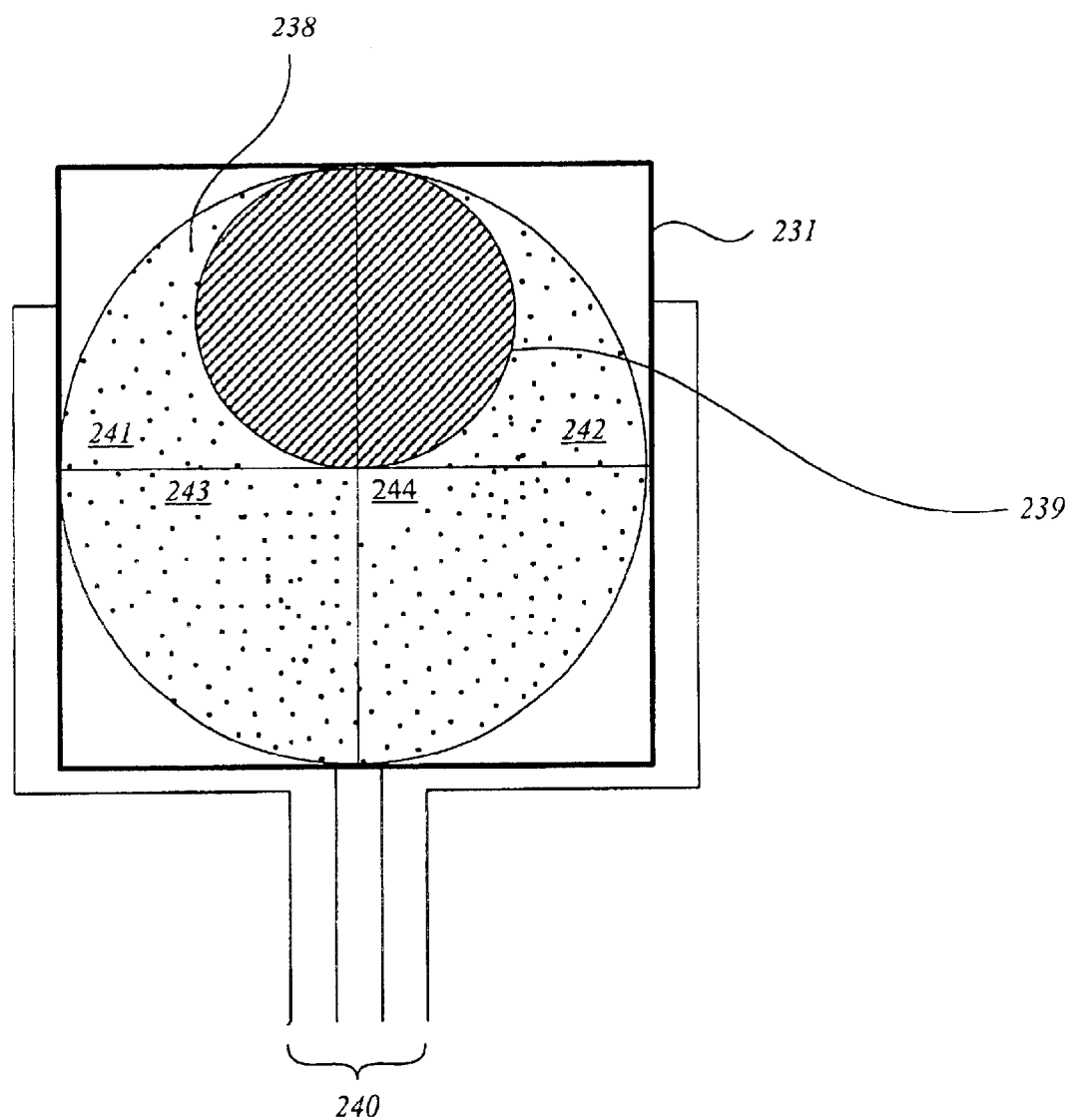
FIG. 5 depicts an embodiment of a quadrature detector in accordance with the present invention.

FIG. 5 depicts an embodiment of quadrature detector 231 featuring dark spot 239 and light ring 238. Such an embodiment is suitable for use in accordance with the principles of the present invention. As can be seen, quadrature detector 231 is fully illuminated within ring 238 except for dark spot 239. As the sensor is tilted, dark spot 239 moves with respect to quadrature detector 231. By tracking the motion of dark spot 239, quadrature detector 231 provides leveling information. The detector element is calibrated so that the output beams are leveled when dark spot 239 is centered in quadrature detector 231. Alternatively, the detector element can be calibrated so that the output beams are leveled when spot 239 is off center—accounting for imperfect alignment of other system components.

Quadrature detector 231 has four photodetectors 241, 242, 243, and 244. When light ring 238 impinges on the photodetectors of the quadrature detector, electrical current is produced. The magnitude of the current bears a relationship to the intensity of the light impinging on photodetectors 241, 242, 243, and 244. This light intensity is reduced by the presence of dark spot 239. The control subsystem in device 1 measures the current produced by the photodetectors and processes the current to determine the location of dark spot 239 on quadrature detector 231. Typically, the current produced by the photodetectors is conducted away from the detector using conductive lines 240, which can be connected to the control subsystem of device 1. The current from photodetectors 241, 242, 243, and 244 is processed to determine the position of dark spot 239. One example of a method used to determine spot 239 position is as follows: In order to determine the left/right (L/R) position of the spot 239, current I241 produced from photodetector 241 is summed with current I243 produced by photodetector 243, and current I242 produced by photodetector 242 is summed with current I244 produced photodetector 244. The two sums are normalized and subtracted from each other as shown in the equation below.

$$[(I241+I243)-(I242+I244)]/(I241+I243+I242+I244)=L/R \text{ Position Current}$$

If the L/R position current is negative, it is known that spot 239 is too far to the left. And, conversely, if the L/R position current provides a positive value, it is known that spot 239 is too far to the right.

The up and down positions of the spot can also be determined with quadrature detector 231. For example, in accordance with the following equation:

$$[(I241+I242)-(I243+I244)]/(I241+I243+I242+I244)=Up/Down \text{ Position Current}$$

If the up/down position current is positive, spot 239 is too low. Conversely, if the up/down position current is negative, then spot 239 is too high. If the depicted spot 239 is used as an example, the left/right position current will be negative and the up/down position current will be positive, which will allow the control subsystem to detect the fact that the beam is in the quadrant detected by photodetector 243. Based on this information, the alignment assemblies are activated to adjust the position of optics mounting assembly 24 in order to move dark spot 239 higher and to the right to level the bubble, thereby leveling output beam 8. In some implementations, current values are converted to voltages for use with a control engine, such as a micro-controller.

In another embodiment, light ring 238 (and dark spot 239) can be generated by a plurality of laser emitting diodes (LED's). Once the device is leveled, the brightness of each of these LED's can be adjusted until dark spot 239 is centered on light detector 231. This is advantageous because it can be accomplished electronically without the need for costly and time consuming alignment steps. Instead, simple adjustment of LED brightness can be used to center the dark spot 139 in a calibration step. One such embodiment can use four LED's.

Figure 6:
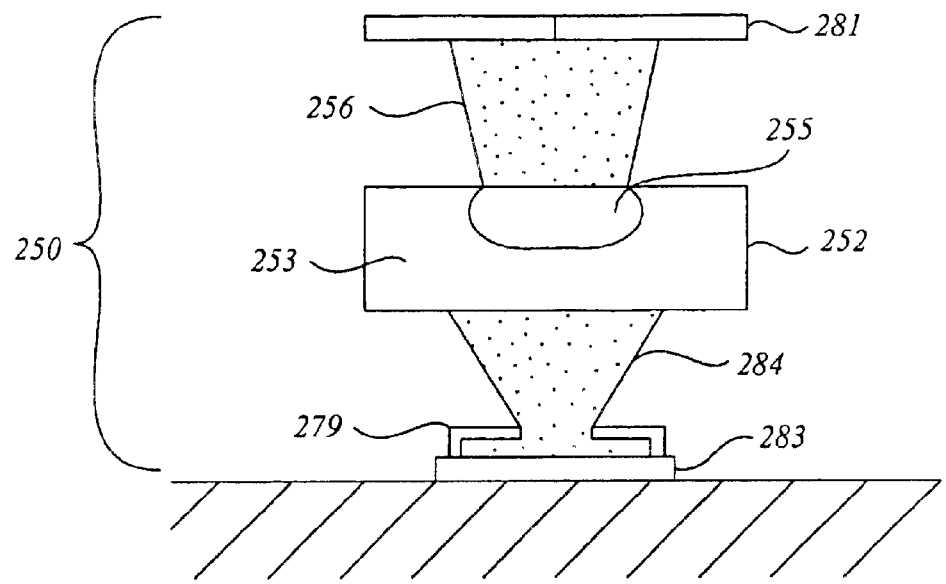
FIGS. 6 and 7 are side-section views of additional level sensor embodiments in accordance with the principles of the present invention.

FIG. 6 depicts the operation of yet another sensor embodiment 250. The sensor element is depicted in a cross-section view. Sensor element 250 includes position sensitive photo sensor 281, bubble level device 252, aperture structure 279, and detector light source 283 for generating detector light beam 284 (also referred to as detector light). As with the previously discussed embodiments, many different types of detector light sources 283 can be used, such as LED's. Detector light 284 is passed through bubble level device 252 onto position sensitive photo sensor 281, which detects whether bubble level device 252 is leveled (as is the case in FIG. 6). In the depicted embodiment, bubble fluid 253 is treated so that it is relatively opaque to detector light 284. For example, a dye can be added to bubble fluid 253, so that a portion of the detector light passes through bubble level device 252 in the region of bubble 255, but not through fluid 253. In other words, detector beam 284 passes readily through bubble 255 of bubble level 252, but is absorbed by fluid 253. As a result, detector light beam 256 exits bubble level 252. Unlike the forgoing embodiments, where the detector beam is ring-shaped, this detector light beam 256 is characterized by a light spot defined by bubble 255. As with the previous embodiments, sensor 250 can be oriented so that beam 284 points downward.

Figure 7:
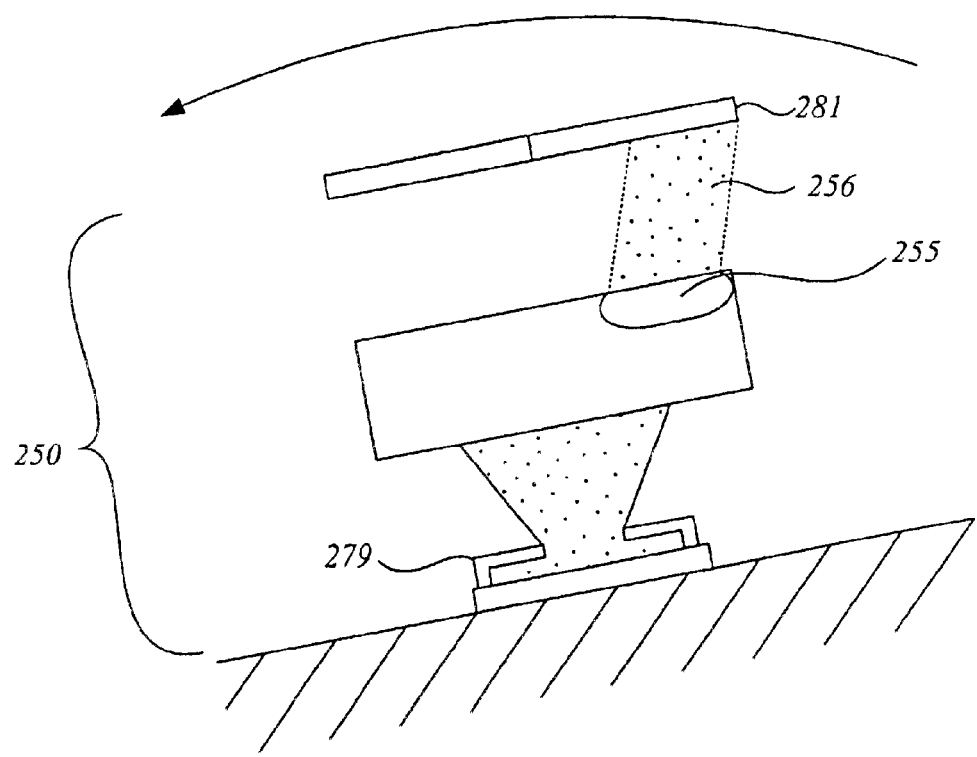

FIG. 7 shows detector 250 tilted to the left. Consequently, bubble 255 moves to the right, altering the amount and position of light 256 sensed by position sensitive photo sensor 281. In accordance with the principles of the present invention, position sensitive photo sensor 281 provides information to control circuitry (not shown here) which activates the alignment assemblies to correct the tilt in output beam 8.

The position sensitive photo detectors work similarly to those described hereinabove. The chief difference being that the electrical information is processed by the photo detectors in a slightly different manner to track the light spot as it moves across the photo detectors. Such methods are known to those having ordinary skill in the art. In a further embodiment, invisible light can be employed in level sensor 80.

Another suitable detector element embodiment can use a pair of single-axis bubble levels arranged at right angles to each other so that a level with respect to a first and second axis can be detected. Each single-axis bubble level is associated with a corresponding light source and a corresponding position sensitive detector. Each corresponding light source and corresponding position sensitive detector is arranged to detect whether each single-axis bubble level is leveled. By leveling each single-axis bubble level, the output beams can be leveled with respect to the aforementioned first and second axes.

C. Level Sensor Mounting

Figure 8:
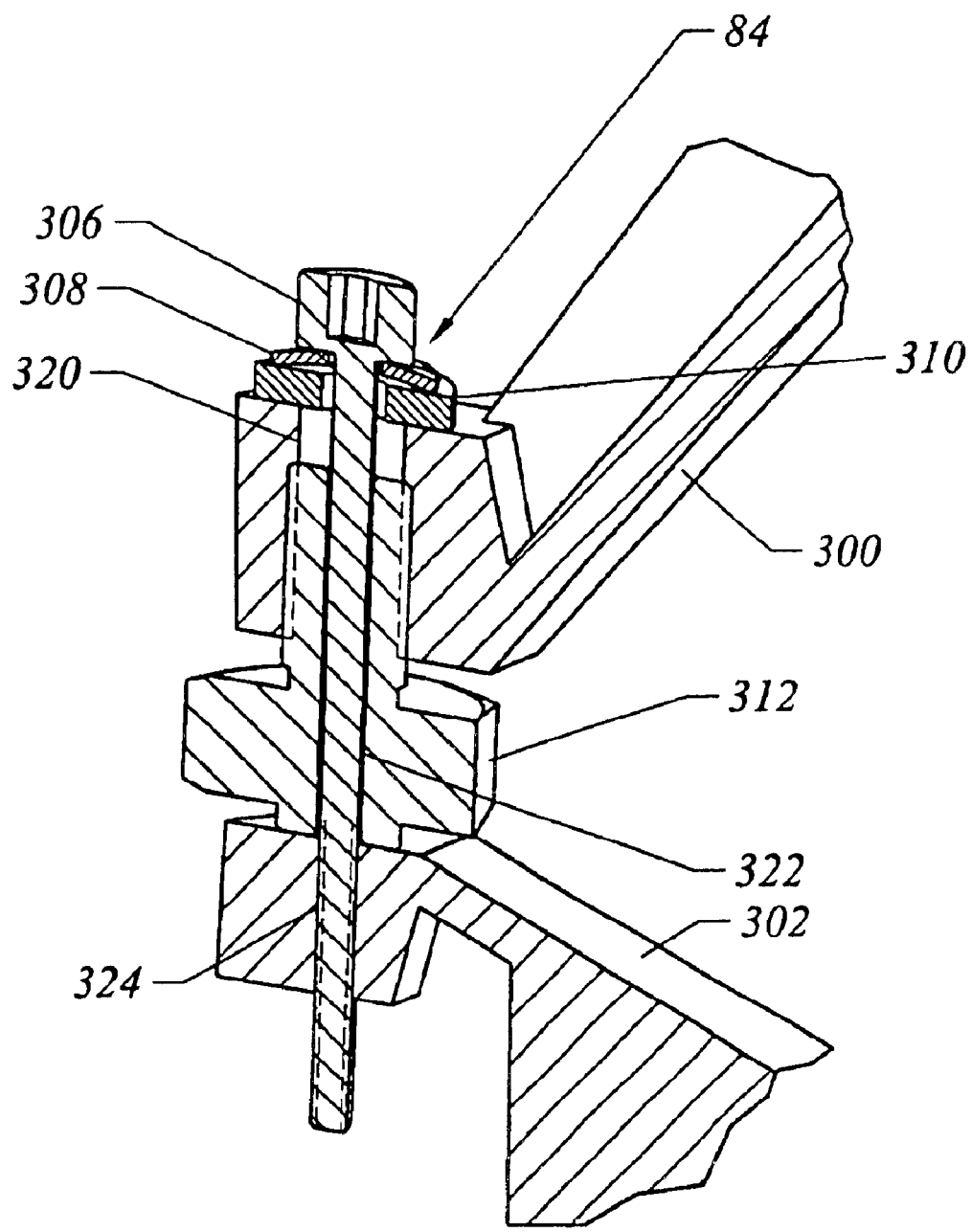
FIG. 8 shows a cross-sectional view of a jack screw assembly mounting a laser sensor to an optics mounting assembly in one embodiment of the present invention.

As shown in FIG. 2C, screw assemblies 82, 84, and 86 mount level sensor 80 to optics mounting assembly 24. FIG. 8 shows a cross-sectional view of one embodiment of screw assembly 84, which can also be used for screw assemblies 82 and 86. The screw assembly in FIG. 8 focuses stresses in the screw connection to reduce stresses on member 300 extending from optics mounting assembly 24 and member 302 extending from level sensor 80. Taking stress off of member 300 is particularly beneficial, so that the chance of destabilizing optics mounting assembly 24 is reduced.

Jack screw 312 has a threaded segment that extends into threaded channel 320 in member 300. Screw 306 extends through Bellville washer 308, washer 310, unthreaded channel 322 in jack screw 312, and threaded channel 324 in member 302. Jack screw 312 rests on member 302, so that channel 322 in jack screw 312 is in line with channel 324 in member 302. Rotating jack screw 312 either pulls members 300 and 302 together or drives members 300 and 302 apart along the central axis of channel 322 in jack screw 312. Rotating screw 306 either pulls members 300 and 302 together or drives members 300 and 302 apart along the central axis of screw 306.

Washer 308 is fitted under the head of screw 306, so that the surface of washer 308 extends downward from an interior circumference to an exterior circumference. This causes the exterior circumference of washer 308 to apply a force toward the surface of member 300. This force takes pressure off of member 300 when screw 306 is not fully tightened. Without the force from washer 308, member 300 would tend to pull against the holding force applied by jack screw 312—creating strain in member 300. This feature can be useful in the manufacturing process of alignment device 1, before screw 306 is fully tightened so that washer 308 is driven to be flat like washer 310.

D. Optical Reflector Assemblies

FIG. 9 illustrates five-sided penta-prism 400, which can be employed to operate as reflector 96. Penta-prism 400 produces an output beam perpendicular to a beam entering through input side 402. In operation, beam 410 enters penta-prism 400 through side 402 and is reflected by mirrored surface 404 to produce reflected beam 412. Mirrored surface 406 reflects beam 412 to create output beam 8. In alternate embodiments, reflector 96 is implemented with objects other than a penta-prism.

FIGS. 10A–10C show alternate embodiments for reflector 96 and the mounting of reflector 96. FIG. 10A shows penta-prism 420, which can be employed to operate as reflector 96. Penta-prism 420 generates output beam 429 in response to input beam 421 reflected by mirrored surfaces 424 and 423. Angle 426 is less than the ideal ninety degrees between beams 410 and 8 in penta-prism 400. In one embodiment, angle 426 is 5 arc-seconds less than ninety degrees. In further embodiments, angle 426 is designed with a tolerance of plus or minus 5 arc-seconds. The desired value of angle 426 can be achieved in one embodiment by increasing angle 425, decreasing angle 427, or increasing angle 425 and decreasing angle 427.

The known decrease in angle 426 is useful for aligning penta-prism 420, so that output beam 8 is normal to input beam 421. With a perfectly angled penta-prism, the alignment can be difficult, due to challenges in mounting reflector 96 on rotation shaft 98 with a zero roll alignment. A deviation in roll of reflector 96 causes output beam 8 to have an incline—increasing the angle between output beam 8 and input beam 421. A known deviation in angle 425 or 427 that decreases angle 426 makes it acceptable to mount penta-prism 420 with a roll other than zero. The decrease in angle 426 is offset by deviations in the roll to move output beam 8 closer to a perpendicular relationship with the input beam to reflector 96. In one embodiment, shaft 98 allows reflector 96 to be mounted within plus or minus 0.1 degree of zero roll alignment.

FIG. 10B shows a cross-section of shaft 98 in one embodiment for mounting an implementation of reflector 96, such as penta-prism 420. This embodiment of shaft 98 makes it easier to mount penta-prism 420 with a desired roll. The V-shaped groove at the top of shaft 98 eliminates any roll effects that would be introduced by imperfections in the top surface of shaft 98. The edges of penta-prism 420 are aligned on the groove surfaces and secured, so that penta-prism 420 has a roll within a desired tolerance. In one embodiment, penta-prism 420 is secured to shaft 98 with an epoxy. In one embodiment, shaft 98 allows reflector 96 to be mounted within plus or minus 0.1 degree of zero roll alignment.

FIG. 10C shows an embodiment of shaft 98 having decline slope 430 on the top surface. When penta-prism 420 is mounted on declined shaft 98, the effects of satellite output beams are significantly reduced. In one implementation, decline angle 432 is offset two degrees from perpendicular. In an alternate implementation, decline angle 432 has a different value. In various embodiments, different penta-prisms can be employed, such as penta-prism 400 or penta-prism 420. The features of shaft 98 in FIGS. 10B and 10C are both employed in some embodiments, while only one of the features or none of the features are employed in alternate embodiments.

In a further embodiment, reflector 96 is partially transmissive, so that a second beam perpendicular to output beam 8 is generated. In alternate embodiments, different angular relationships to output beam 8 can be employed. In one implementation, penta-prism face 404 or 424 is partially transmissive—allowing the penta-prism's input beam to extend through the penta-prism. In further implementations, a refraction-compensated and half-silvered penta-prism is employed. In order to allow a beam to pass through rotation cap 6, a window or other opening can be formed in cap 6.

E. Manual Rotation Cap

Figure 11A:
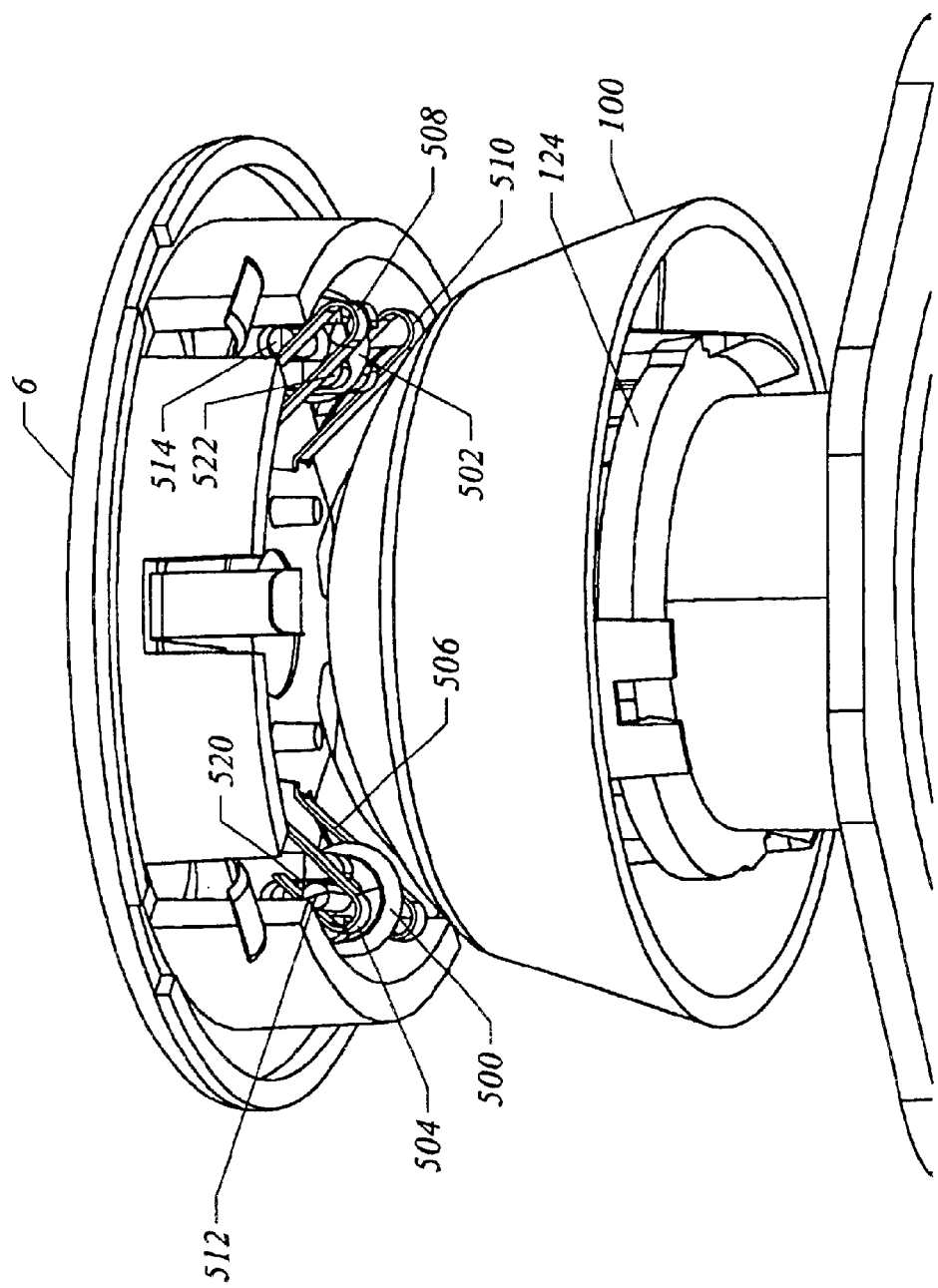
FIGS. 11A–11B show various perspective views of one embodiment of a rotation cap for use in the alignment device shown in FIG. 1.
Figure 11B:
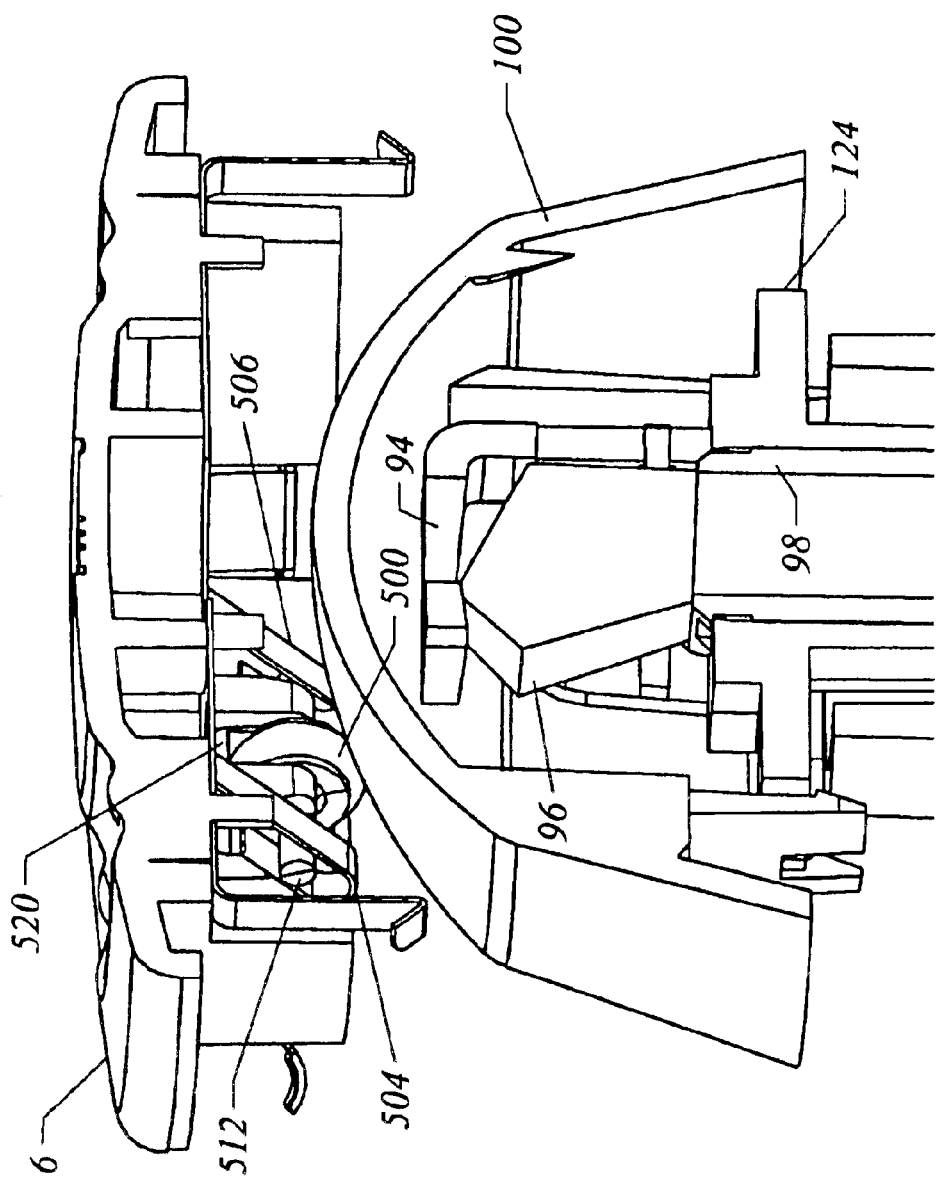

FIGS. 11A and 11B show a perspective view of rotation cap 6, which can be used to manually rotate the position of reflector 96. Rotation cap 6 allows a user's manual rotation force to be applied, while any extraneous translation forces are ignored. As shown in FIG. 2I, rotation shaft 98 extends through reflector rotation mount 94. Rotation mount 94 is coupled to rotation shaft 98, so that the rotation of mount 94 causes shaft 98 to rotate. Mount 94 includes ridge 124. Cap 100 is coupled to ridge 124, so that rotation force applied to cap 100 causes rotation mount 94 to rotate shaft 98.

Figure 12:
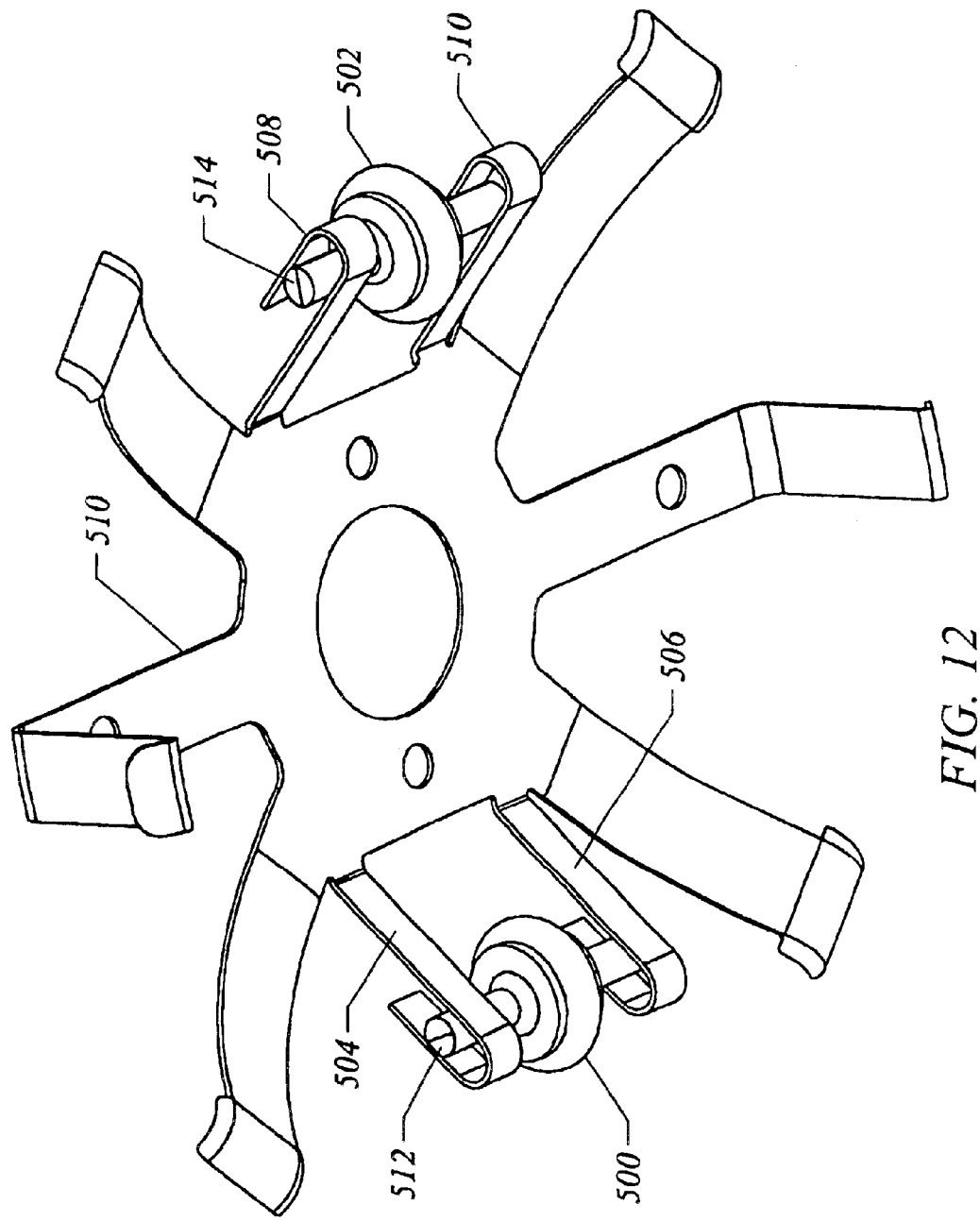
FIG. 12 shows a perspective view of the spring mechanism in the rotation cap shown in FIGS. 11A–11B.

Rotation cap 6 includes a spring controlled wheel assembly to limit the translational force applied to cap 100. FIG. 12 shows spring controlled wheel assembly including wheels 500 and 502. Prongs 504 and 506 secure axel 512 passing through wheel 500. Prongs 508 and 510 secure axel 514 passing through wheel 502. When a user is not applying force to rotation cap 6, axel 512 rests on the bottom surfaces of prongs 504 and 506, as shown in FIG. 12. Axel 514 rests on the bottoms of prongs 508 and 510, as shown in FIG. 12. In one embodiment, prongs 504, 506, 508, and 510 are formed using flexible sheet metal or steel.

When a user presses down on rotation cap 6, axels 512 and 514 slide into grooves 520 and 522, respectively, while maintaining contact with cap 100. When wheels 500 and 502 are in their respective grooves, the top portions of prongs 504 and 506 apply a force on axel 512 that causes wheel 500 to maintain contact with cap 100. Similarly, the top portions of prongs 508 and 510 apply a force on axel 514 that causes wheel 502 to maintain contact with cap 100. The friction between the surface of cap 100 and the surfaces of wheels 500 and 502 prevents wheels 500 and 502 from sliding along cap 100, except for rotation about their respective axels 512 and 514. This friction results in cap 100 rotating in response to a rotation force applied to rotation cap 6 while cap 6 is depressed. This rotation of cap 6 adjusts the position of output beam 8 by rotating shaft 98. In one embodiment, the wheel surfaces are rubber and the surface of cap 100 is plastic.

For safety purposes, the intensity of output beam 8 can be reduced during a manual rotation. In one implementation, laser output beam 8 is reduced to 20% of its normal intensity. In one embodiment, alignment device 1 reduces the intensity of output beam 8 upon detecting that level sensor 80 has a predetermined deviation from level. This operation is performed by the control subsystem detecting an out of level indication and reducing the intensity of the beam from laser source 116. In various embodiments, different methods can be employed to reduce the intensity of beam 8. In addition to reducing the intensity of beam 8, the control subsystem ceases all automated rotation of rotation shaft 98 until a level orientation is re-established. This inhibits the generation of laser planes and dithered reference lines.

F. Producing Vertical References

In order to produce vertical references, such as lines and planes, a user rotates alignment device 1 by ninety-degrees. In one embodiment, the user rotates alignment device 1, so that arms 34 and 36 on optics mounting assembly 24 are directed towards the ground. To facilitate this orientation, alignment device 1 provides a bubble vial mounted to frame 90, as shown in FIGS. 2H and 2I. In the rotated position, bubble vial 90 is on the exposed top surface of alignment device 1 for use by the user in adjusting the position of output beam 8. In the embodiment shown in FIGS. 2A–2I, self-leveling is not provided in the rotated state. In alternate embodiment, self-leveling is provided in the rotated state. In the rotated orientation, the above-described first and second spring systems and alignment assemblies continue to operate as described above to secure and adjust the position of optics mounting assembly 24 within pivot socket 22.

III. Control Subsystem

A. Architectural Overview

Figure 13:
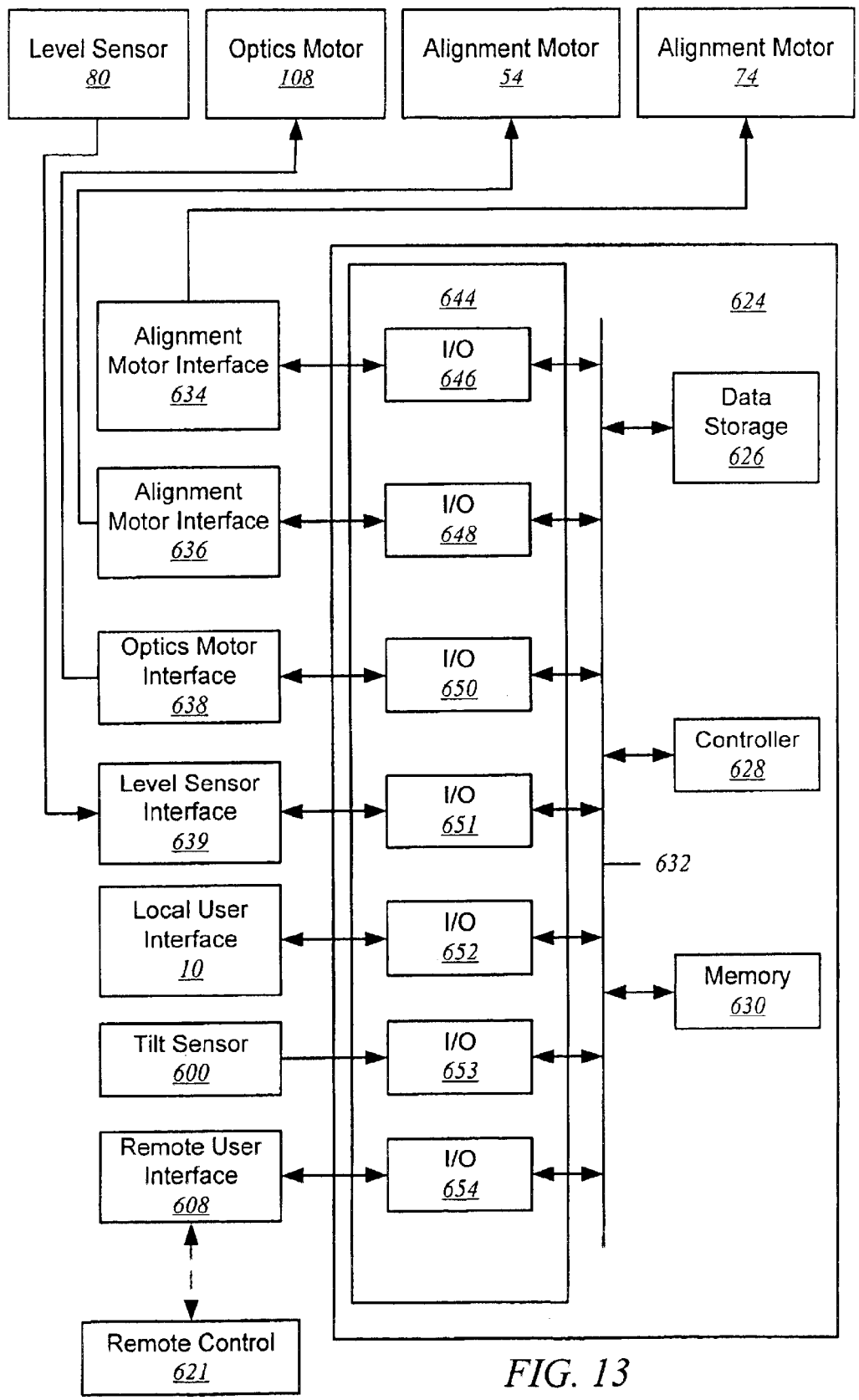
FIG. 13 is a block diagram for one implementation of a control subsystem for the alignment device in FIG. 1.

FIG. 13 is a block diagram of control subsystem 624 in alignment device 1, as well as, alignment motor interface 634, alignment motor interface 636, optics motor interface 638, level sensor interface 639, local user interface 10, tilt sensor 600, and remote user interface 608.

Control subsystem 624 controls user interfaces to alignment device 1 and the operation of motors in alignment device 1. Control subsystem 624 includes bus 632 coupling controller 628, data storage unit 626, memory 630, and input/output block 644. Controller 628 is a central processing unit used for executing program code instructions, such as a microprocessor or mircocontroller. In response to program code instructions, controller 628 retrieves and processes data and provides data and control signals. Input/output block 644, data storage unit 626 and memory 630 are all coupled to bus 632 to exchange data and control signals with controller 628.

Memory 630 stores, in part, data and instructions for execution by controller 628. If a process is wholly or partially implemented in software, memory 630 may store the executable instructions for implementing the process when alignment device 1 is in operation. Memory 630 may include banks of dynamic random access memory, static random access memory, read-only memory and other well known memory components Data storage unit 626 provides non-volatile storage for data and instructions for use by controller 628. In software embodiments of the present invention, data storage unit 626 may store instructions executed by controller 628 to perform processes. Data storage unit 626 may support portable storage mediums, fixed storage mediums or both Data storage unit 626 implements fixed storage mediums using a magnetic disk drive or an optical disk drive. Data storage unit 626 supports portable storage mediums by providing a portable storage medium drive that operates in conjunction with portable non-volatile storage mediums—enabling the input and output of data and code to and from control subsystem 624. Examples of portable storage mediums include floppy disks, compact disc read only memory, or an integrated circuit nonvolatile memory adapter (i.e. PC-MCIA adapter). In one embodiment, instructions for enabling control subsystem 624 to execute processes are stored on a portable medium and input to control subsystem 624 via a portable storage medium drive.

For purposes of simplicity, all components in control subsystem 624 are shown as being connected via bus 632. Control subsystem 624, however, may be connected through one or more data transport mechanisms. For example, controller 628 and memory 630 may be connected via a local microprocessor bus, and data storage unit 626 and input/output block 644 may be connected via one or more input/output (I/O) busses.

Input/output ports 646, 648, 650, 651, 652, 653, and 654 in input/output block 644 couple bus 632 to alignment motor interface 634, alignment motor interface 636, optics motor interface 638, level sensor interface 639, local user interface 10, tilt sensor 600, and remote user interface 608, respectively. Alignment motor interface 634 is coupled to alignment motor 74. Alignment motor interface 636 is coupled to alignment motor 54. Optics motor interface 638 is coupled to optics motor 108. Motor interfaces 634, 636, and 638 provide conversions between the digital data and control signaling of control subsystem 624 and the analog signaling of the motors. In one embodiment, optics motor 80 has fine cogging and provides sufficient torque to rotate reflector 96. Alignment motors 54 and 74 also have fine cogging in one embodiment.

Level sensor interface 639 is coupled to level sensor 80 to receive level indicator signals and pass them to input/output port 651—converting the analog signals of level sensor 80 into digital signals. Tilt sensor 600 is coupled to input/output port 653 to indicate when alignment device 1 has been rotated to provide vertical references. Input/output ports 652 and 654 in input/output block 644 couple bus 632 to user interfaces 10 and 608. Input/output port 652 is coupled to local user interface 10. Input/output port 654 is coupled to remote user interface 608. Local user interface 10 provides a portion of the user interface for a user of alignment device 1 to control the operation of device 1. In different implementations, local user interface 10 may include an alphanumeric keypad or cursor control device, such as a mouse, trackball, stylus, or cursor direction keys. Information provided by the user through local user interface 10 is provided to controller 628 through input/output port 652.

Remote user interface 608 enables a user to communicate with alignment device 1 using remote control 621—allowing the user to provide instructions. Remote user interface 608 supports the protocol required for facilitating a communications link with remote control 621—providing conversions between the digital signaling of control subsystem 624 and the signaling of remote control 621. For example, one type of remote control communicates with remote user interface 608 through a radio frequency connection. Another type of remote control communicates with remote user interface 608 via an infrared signaling connection.

U.S. Pat. No. 5,680,208 and U.S. Pat. No. 5,903,345 provide examples of remote controls and remote control interfaces that can be used with alignment device 1. U.S. Pat. No. 5,680,208 and U.S. Pat. No. 5,903,345 are hereby incorporated by reference.

In addition to the above-described components, control subsystem 624 may include a display system and a communications controller. A display system enables alignment device 1 to display textual and graphical information. The display system may include a cathode ray tube (CRT) display or liquid crystal display (LCD). The display system would receive textual and graphical information from controller 628 through input/output block 644. Potential communications controllers include network interface cards or integrated circuits for interfacing alignment device 1 to a communications network. Instructions for enabling control subsystem 624 to perform processes may be down loaded into memory 630 over the communications network.

Those skilled in the art will recognize that FIG. 13 only shows one embodiment of control subsystem 624 and that numerous variations of control subsystem 624 fall within the scope of the present invention. The components contained in control subsystem 624 are those typically found in general purpose computer and control systems, and in fact, these components are intended to represent a broad category of such computer components that are well known in the art.

B. Aligning Horizontal References

Figure 14:
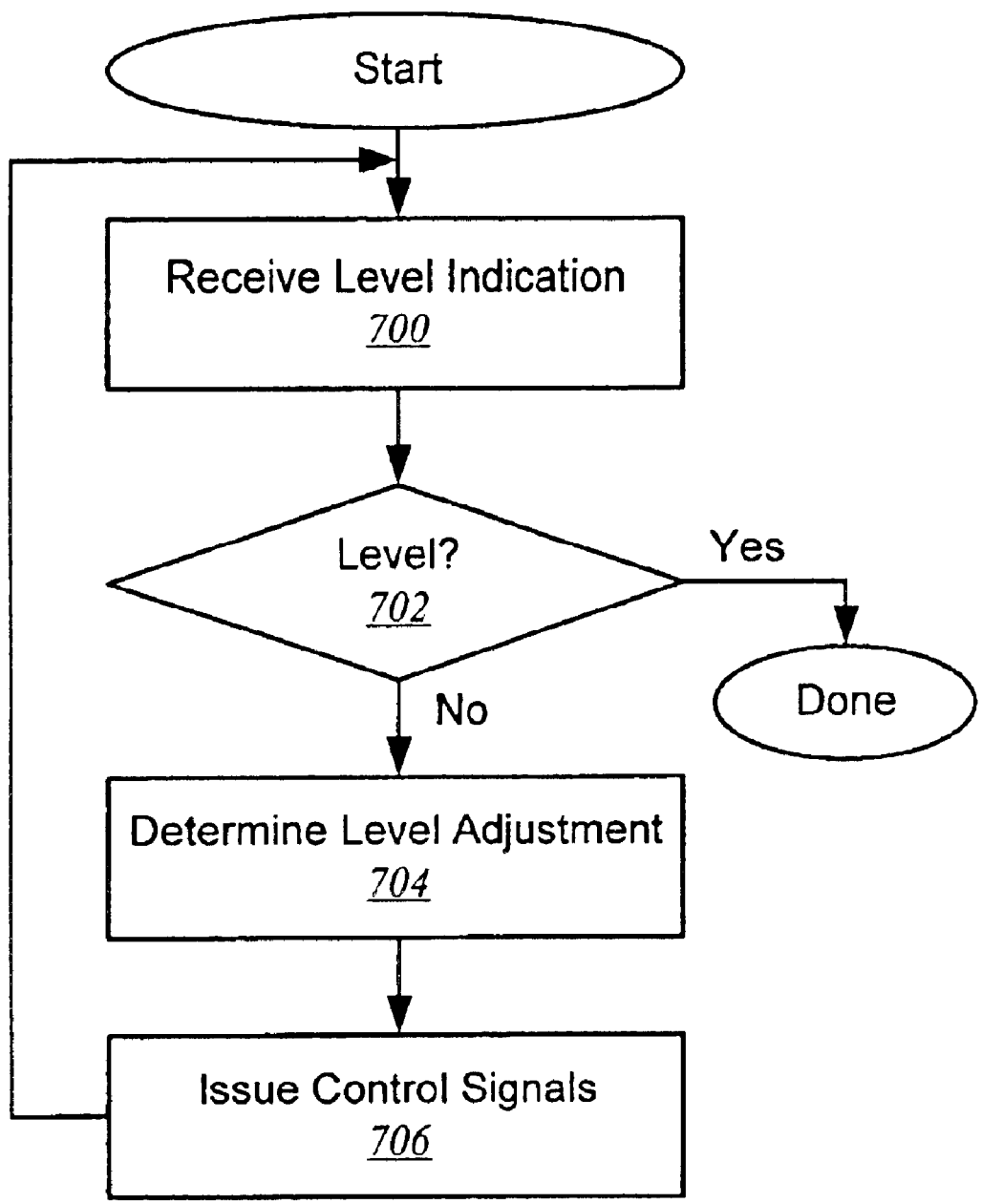
FIG. 14 is a flowchart describing one implementation of a process for leveling a horizontal reference.

FIG. 14 provides one implementation of a process performed by alignment device 1 to bring output beam 8 into a position parallel to true level. This process is performed when alignment device 1 is positioned as shown in FIG. 1. Level sensor interface 639 receives a level indication from level sensor 80 (step 700). Control subsystem 624 determines whether the level indication identifies output beam 8 as parallel to true level (step 702). In one embodiment, this determination is made using the current values provided by level sensor 80, as described above. If output beam 8 is level, the process in done. Otherwise, control subsystem 624 determines an appropriate level adjustment to move output beam 8 to the desired position (step 704). In one implementation, this determination is also made using current values from level sensor 80. Control subsystem 624 then issues control signals for one or more of alignment motors 54 and 74 to reposition optics mounting assembly 24 (step 706). After the signals are issued, the above described process is repeated.

In one embodiment, control subsystem 624 directs the operation of motors 54 and 74 one at a time to limit the amount of current drawn by alignment device 1. In one implementation, control subsystem 624 achieves small motor movements by giving a motor a first pulse in a first direction and a larger second pulse in a second direction opposite to the first direction. This results in the motor moving in the second direction. In various embodiments, the second pulse is 4 to 16 times larger than the first pulse, resulting in stepped movements in the second direction of one seventy-fifth of a full motor shaft rotation. In an alternate implementation, control subsystem 624 only provides for motor motion in a forward or reverse direction to achieve movement in that direction.

Figure 15:
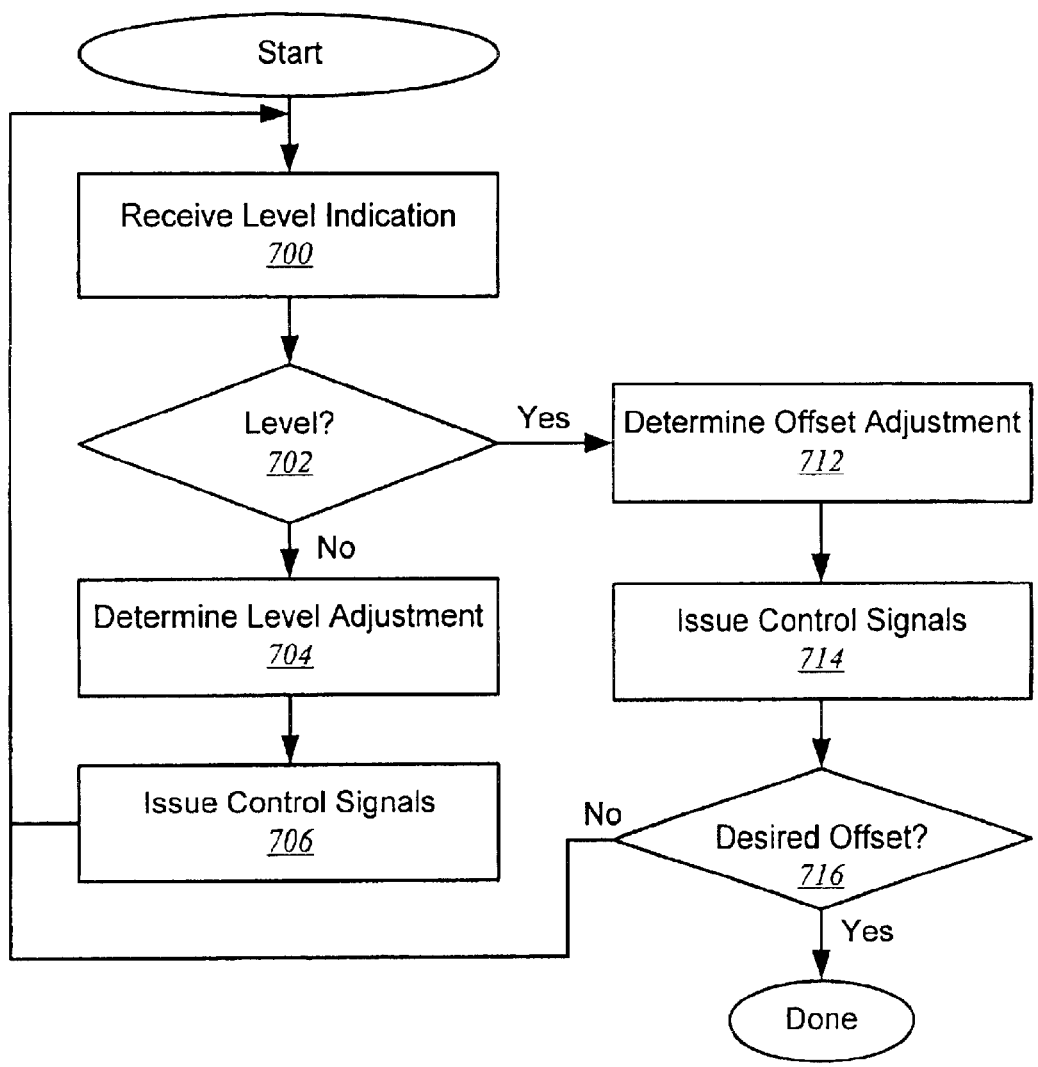
FIG. 15 is a flowchart describing one implementation of a process for setting a horizontal reference to a predetermined offset.

FIG. 15 shows one process for alignment device 1 to give output beam 8 a desired angular offset from true level. Control subsystem 624 first brings output beam 8 to true level as described above with reference to FIG. 14. Once output beam 8 is level (step 702), control subsystem 624 determines an offset adjustment to make to optics mounting assembly 24, using motors 54 and 74 (step 712). Control subsystem 624 issues control signals for motors 54 and 74 in accordance with the determination made in step 712 (step 714). If the offset is correct the process is done. Otherwise, the process can be performed again starting with the leveling operation (step 716).

In one embodiment, lead screws 46 and 66 have encoders mounted thereon to provide control subsystem 624 with the position of lead screws 46 and 66. Control subsystem 624 correlates encoder intervals to the angular movement of output beam 8 to determine the magnitude of lead screw rotation required to achieve a desired angular offset (step 712). In a further implementation, the encoders are employed to control the speed of the motors driving the lead screws.

In a further embodiment, level sensor 80 facilitates the operation of a bump sensor. When alignment device 1 is jarred, bubble 235 in level sensor 80 undergoes a momentary change, such as a rapid change in position. Level sensor 80 sends signals identifying this change to control subsystem 624. In response, control subsystem 624 ceases rotation of reflector 96, reduces or eliminates the power of output beam 8, and levels alignment device 1 as disclosed above with reference to FIG. 14.

In an alternate embodiment, alignment device 1 brings output beam 8 to a desired angular offset from level in a single operation. This avoids the need to first level then obtain the offset.

C. Aligning Vertical References

Figure 16:
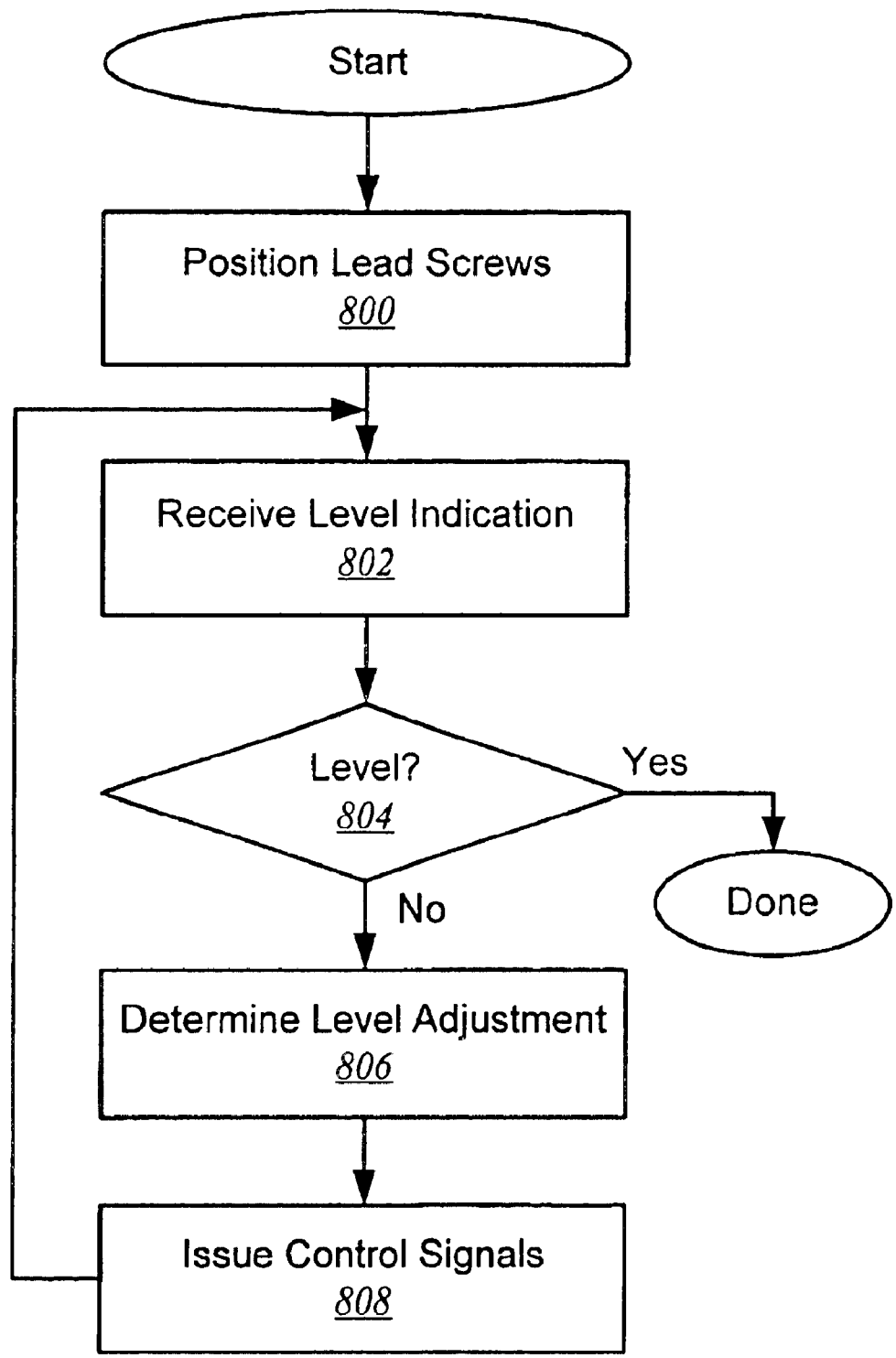
FIG. 16 is a flowchart describing one implementation of a process for leveling a vertical reference.

FIG. 16 shows one embodiment of a process for aligning output beam 8 when alignment device 1 is rotated ninety degrees from the position shown in FIG. 1 to produce vertical references. Once alignment device 1 is rotated, tilt sensor 600 recognizes the rotation of device 1 and issues a signal. In response to the signal, control subsystem 624 sets lead screws 46 and 66 to a predetermined position (step 800).

In one embodiment, control subsystem 624 directs motors 54 and 74 to fully extend each lead screw. Control subsystem 624 detects full extension from a pair of sensors (not shown) that provide signals upon coming into contact with lead screws 46 and 66. In one implementation, the portions of springs 1004 and 1006 that are opposite from edges 1005 and 1007, respectively, provide the contact interfaces to the sensors. After both lead screws are fully extended, control subsystem directs motors 54 and 74 to position pads 46 and 66 at a predetermined position. For example, lead screws 46 and 66 are translated to positions that correlate to a predetermined number of motor pulses. In one embodiment, encoders are mounted on screws 42 and 62 to correlate screw translation to motor pulses. Alternatively, the encoders are mounted to the shafts of motors 54 and 74.

Once the lead screws are positioned, a user looks at bubble level 90 to determine whether optics mounting assembly 24 is leveled—the central axis of optics mounting system being parallel to true level (step 802). If bubble level 90 signals a level, the process in done (step 804). Otherwise, the user employs local interface 10 or remote control 621 to direct control subsystem 624 to determine a new level adjustment (step 806). In one embodiment, the user indicates a number of desired lead screw turns, and control subsystem 624 determines the required signal to make motors 54 and 74 carry out the user defined action (step 806). Control subsystem 624 then issues the determined signals to motors 54 and 74 (step 808). The above-described process in then repeated starting with step 802. In alternate embodiments, the user provides different forms of data to specify lead screw movement, such as the time period a control button is pressed.

Figure 17:
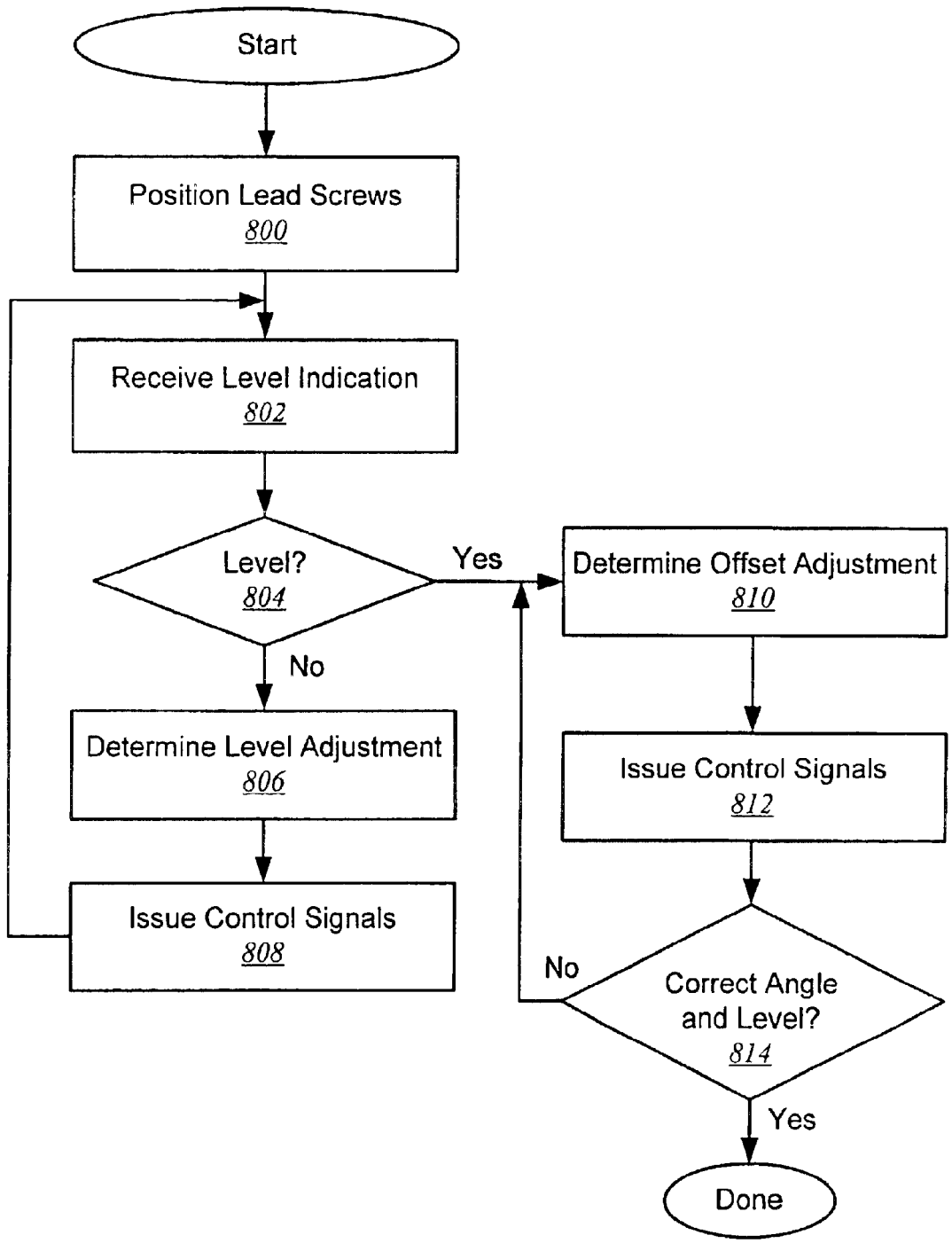
FIG. 17 is a flowchart describing one implementation of a process for setting a vertical reference to a predetermined offset.

FIG. 17 shows a process for positioning output beam 8 when alignment device 1 is rotated as described with reference to FIG. 16. This can be useful when a user wants to translate a vertical laser plane from output beam 8 on an incident surface. As a first step, the leveling process described in FIG. 17 is performed.

Once level is detected, an offset adjustment is determined (step 810) for achieving a desired yaw. A user employs local interface 10 or remote control 621 to indicate a magnitude of movement desired from lead screws 46 and 66. In one embodiment, lead screws 46 and 66 are moved in opposite directions to achieve an output reference translation, while maintaining an orthogonal vertical laser plane or line. Control subsystem 624 converts the user's input into signals that will drive motors 54 and 74. Control subsystem 624 then issues these signals for motors 54 and 74 (step 812). If the resulting output reference position is correct, the process is done (step 814). Otherwise, the process is repeated starting at step 810. In one embodiment, the user looks at bubble vial 90 and the incident laser beam output to determine if the resulting output beam repositioning is correct. In alternate embodiments, the process shown in FIGS. 16 and 17 are fully automated.

In an alternate embodiment, alignment device 1 brings output beam 8 to a desired angular offset from level in a single operation. This avoids the need to first level then obtain the offset.

D. Automated Reference Positioning

In one implementation of alignment device 1, operators select the location of reference lines and points by providing a location input through remote control 621 or local user interface 10—causing optics motor 108 to rotate penta-prism 96 into a desired position for a reference point or line. In the case of a reference line, motor 108 also dithers shaft 98 between two positions to create a line on an incident surface. Alignment device 1 includes a motor control mechanism that enables operators to accurately position optics motor 108 when selecting reference line and point locations. In one implementation, motor 108 is a direct drive motor, such as the motors used in compact disc players.

Figure 18:
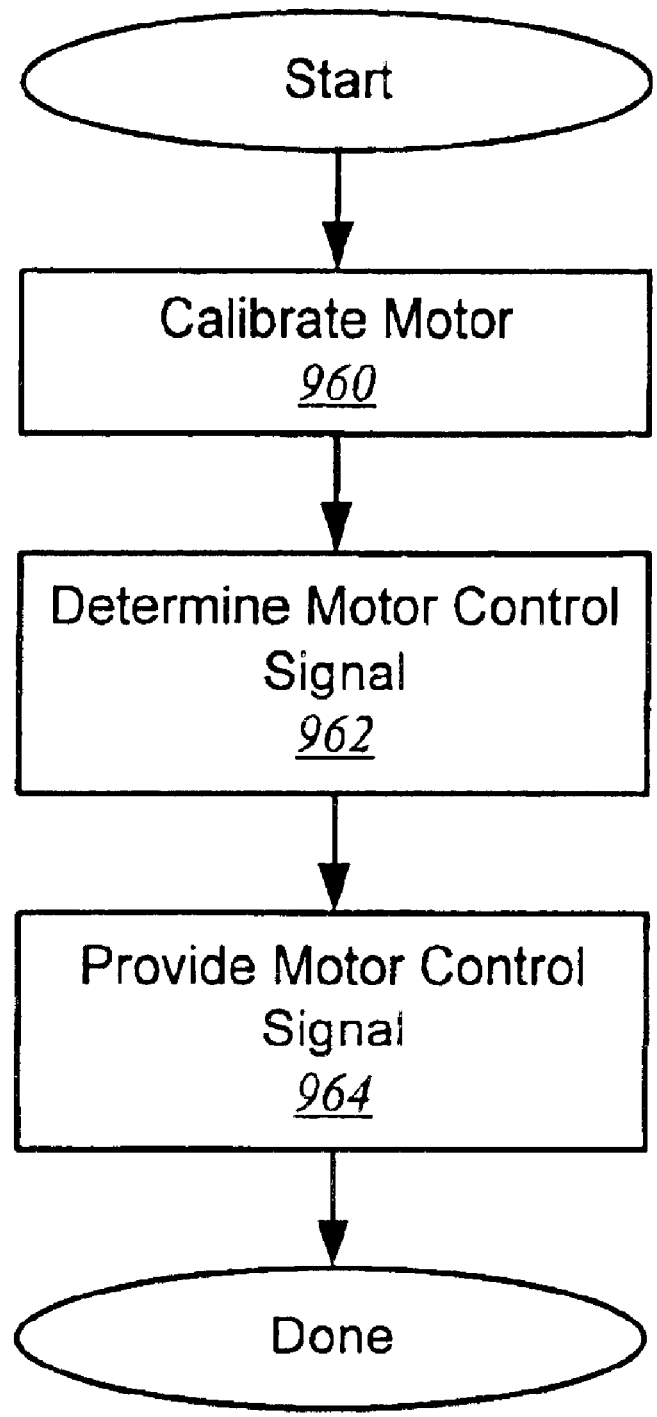
FIG. 18 is a flowchart describing one version of a process for positioning horizontal and vertical references.

FIG. 18 shows a process employed by alignment device 1 to position optics motor 108. Device 1 controls motor 108 by providing a control signal. The pulse width and frequency of the control signal determine the magnitude of rotation of optics motor 10. Optics motor 108 is first calibrated to identify an ideal pulse width for use in motor 108 (step 960). Next, device 1 determines the motor control signal necessary for positioning motor 108 to a desired position (step 962) and provides the signal to motor 108 (step 964). The motor pulse width can be recalibrated as needed to ensure accurate operation. In such an embodiment, step 964 loops back to step 960 when recalibration is needed. One implementation steps for performing the process shown in FIG. 18 us found in U.S. patent application Ser. No. 09/928,244, which is incorporated herein by reference.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An apparatus comprising:
   a pivot socket;
   an optics mounting assembly extending through said pivot socket;
   a first spring system in communication with said optics mounting assembly, wherein said first spring system directs said optics mounting assembly through said pivot socket;
   at least one alignment assembly in communication with said optics mounting assembly; and
   a second spring system in communication with said optics mounting assembly, wherein said second spring system directs said optics mounting assembly toward said at least one alignment assembly.

2. An apparatus according to claim 1, wherein said first spring system applies a force to said optics mounting assembly along an axis through said pivot socket.

3. An apparatus according to claim 2, wherein said axis is perpendicular to a cross section of an opening in said pivot socket, wherein said optics mounting assembly passes through said opening.

4. An apparatus according to claim 1, wherein said first spring system includes a first set of springs, wherein each spring in said first set of springs is coupled to said pivot socket and said optics mounting assembly.

5. An apparatus according to claim 4, wherein said first spring system consists of 3 springs.

6. An apparatus according to claim 4, wherein:
   said pivot socket includes a set of locations,
   each spring in said first spring system is coupled to said pivot socket at a location in said set of locations, and
   locations in said set of locations are equally spaced apart.

7. An apparatus according to claim 1, wherein:
said optics mounting assembly includes at least one arm in communication with said at least one alignment assembly, and
said second spring system biases said at least one arm to abut said at least one alignment assembly.

8. An apparatus according to claim 1, wherein:
said at least one alignment assembly includes a first alignment assembly and a second alignment assembly,
said optics mounting assembly includes a first arm in communication with said first alignment assembly and a second arm in communication with said second alignment assembly, and
said second spring system biases said first arm to abut said first alignment assembly and biases said second arm to abut said second alignment assembly.

9. An apparatus according to claim 8, wherein said first arm is perpendicular to said second arm.

10. An apparatus according to claim 8, wherein said second spring system includes a first spring and a second spring.

11. An apparatus according to claim 10, wherein:
said first spring biases said first arm to abut said first alignment assembly, and
said second spring biases said second arm to abut said second alignment assembly.

12. An apparatus according to claim 11, wherein said first spring is a leaf spring and said second spring is a leaf spring.

13. An apparatus according to claim 12, wherein said first spring is mounted to said first alignment assembly and said second spring is mounted to said second alignment assembly.

14. An apparatus according to claim 13, wherein said first spring is in communication with said first arm and said second spring is in communication with said second arm.

15. An apparatus according to claim 1, further including a level sensor mounted to said optics mounting assembly.

16. An apparatus according to claim 15, wherein said level sensor is mounted to said optics mounting assembly using at least one screw assembly, wherein:
said level sensor includes a first member with a first threaded channel adapted to receive said screw assembly,
said optics mounting assembly has a second member with a second threaded channel adapted to receive said screw assembly, and
said screw assembly includes:
a jack screw having a hollow first segment extending into said second threaded channel and a hollow second segment residing outside of said second threaded channel and in contact with said first member, wherein said first segment has a threaded exterior in communication with said second threaded channel, and
a screw extending through said first segment of said jack screw, said second segment of said jack screw, and said first threaded channel, wherein an exterior portion of said screw extending through said first threaded channel has a threaded exterior in communication with said first threaded channel.

17. An apparatus according to claim 16, further including a washer, wherein said washer extends outward and downward from a head on said screw toward said second member.

18. An apparatus according to claim 17, wherein said washer is in contact with said second member.

19. An apparatus according to claim 1, further including a control subsystem adapted to position said optics mounting assembly.

20. An apparatus according to claim 1, further including:
a level sensor adapted to monitor said optics mounting assembly, and supply at least one indicator corresponding to an orientation of said optics mounting assembly; and
a control subsystem in communication with said level sensor to receive said at least one indicator and adapted to control operation of said at least one alignment assembly based at least in part on said at least one indicator.

21. An apparatus according to claim 20, wherein:
said optics mounting assembly includes a first arm in communication with a first alignment assembly in said at least one alignment assembly, and
said first alignment assembly includes a first lead screw, wherein rotating said first lead screw alters a position of said first arm.

22. An apparatus according to claim 21, wherein:
said optics mounting assembly includes a second arm in communication with a second alignment assembly in said at least one alignment assembly, and
said second alignment assembly includes a second lead screw, wherein rotating said second lead screw alters a position of said second arm.

23. An apparatus according to claim 22, wherein:
said second spring system includes a first spring and a second spring,
said first spring biases said first arm to abut said first alignment assembly, and
said second spring biases said second arm to abut said second alignment assembly.

24. An apparatus according to claim 23, wherein said first spring is a leaf spring and said second spring is a leaf spring.

25. An apparatus according to claim 23, wherein:
said first spring is mounted to said first alignment assembly and is in communication with said first arm, and
said second spring is mounted to said second alignment assembly and is in communication with said second arm.

26. An apparatus according to claim 22, wherein said control subsystem includes at least one controller readable storage medium having controller readable code embodied on said at least one controller readable storage medium, said controller readable code for programming said at least one controller to perform a method including the steps of:
(a) positioning said first lead screw in response to said at least one indicator; and
(b) positioning said second lead screw in response to said at least one indicator.

27. An apparatus according to claim 26, wherein said steps (a) and (b) combine to result in said at least one indicator from said level sensor indicating a true level orientation.

28. An apparatus according to claim 27, wherein said method includes the steps of:
(c) positioning said first lead screw and said second lead screw to place said optics mounting assembly at an angular offset.

29. An apparatus according to claim 28, wherein said a first encoder is associated with said first lead screw and a second encoder is associated with said second lead screw and said step (c) includes the steps of:
(1) rotating said first lead screw through a first number of increments on said first encoder, wherein said first number of increments corresponds to said angular offset; and (2) rotating said second lead screw through a second number of increments on said second encoder, wherein said second number of increments corresponds to said angular offset.

30. An apparatus according to claim 26, wherein said first alignment assembly includes a first motor having a first shaft and said first lead screw rotates in response to rotation of said first shaft, wherein said step (a) includes the steps of:
(1) sending said first motor a first signal that corresponds to said first motor rotating said first shaft in a first direction; and
(2) sending said first motor a second signal that corresponds to said first motor rotating said first shaft in a second direction, wherein:
said second signal corresponds to a larger rotation than a rotation corresponding to said first signal, and
said second signal inhibits said motor from rotating said first shaft in said first direction and causes said first shaft to rotate in said second direction.

31. An apparatus according to claim 30, wherein said second alignment assembly includes a second motor having a second shaft and said second lead screw rotates in response to rotation of said second shaft, wherein said step (b) includes the steps of:
(1) sending said second motor a second signal that corresponds to said second motor rotating said second shaft in a third direction; and
(2) sending said second motor a fourth signal that corresponds to said second motor rotating said second shaft in a fourth direction, wherein:
said fourth signal corresponds to a larger rotation than a rotation corresponding to said third signal, and
said fourth signal inhibits said motor from rotating said second shaft in said third direction and causes said second shaft to rotate in said fourth direction.

32. An apparatus according to claim 31, wherein said first direction is opposite of said second direction and said third direction is opposite of said fourth direction.

33. An apparatus according to claim 26, wherein said method includes the steps of:
(d) detecting that said optics mounting assembly has been tilted beyond a threshold; and
(e) positioning said first and second lead screws in response to said step (d).

34. An apparatus according to claim 33, wherein said step (e) results in said optics mounting assembly having a predetermined orientation.

35. An apparatus according to claim 34, wherein said optics mounting assembly includes a reflector that spins to produce an output plane of light, and said predetermined orientation results in said output plane of light being perpendicular to true level.

36. An apparatus according to claim 33, wherein said step (d) detects that said optics mounting assembly has been tilted beyond said threshold if said optics mounting assembly has been tilted by ninety degrees.

37. An apparatus according to claim 33, wherein said step (e) includes the step of:
(1) positioning said first lead screw in a first predetermined position; and
(2) positioning said second lead screw in a second predetermined position.

38. An apparatus according to claim 37, wherein said method includes the steps of:
(f) positioning said first lead screw and said second lead screw in response to at least one user input.

39. An apparatus according to claim 38, further including a bubble level oriented to determine an alignment of said optics mounting assembly with respect to true level when said apparatus is in at least one position that causes a detection in said step (d) that said optics mounting assembly has been tilted beyond said threshold.

40. A method according to claim 38, wherein said step (f) includes the steps of:
(1) moving said first lead screw in a first direction; and
(2) moving said second lead screw in a second direction opposite to said first direction.

41. An apparatus according to claim 40, wherein said optics mounting assembly includes a reflector that spins to produce an output plane of light, and said steps (f)(1) and (f)(2) combine to position said output plane of light perpendicular to true level with a yaw corresponding to said at least one user input.

42. An apparatus according to claim 38, wherein:
a first encoder is associated with said first lead screw;
a second encoder is associated with said second lead screw; and
said step (f) includes the steps of:
(3) rotating said first lead screw through a first number of increments on said first encoder, and
(4) rotating said second lead screw through a second number of increments on said second encoder.

43. An apparatus according to claim 26, wherein said optics mounting assembly includes a light source adapted to provide a light beam and said method includes the step of:
(g) decreasing an intensity of said light beam from said light source in response to a change of state in said at least one indicator.

44. An apparatus according to claim 1, wherein said first alignment assembly includes:
a lead screw;
a motor having a shaft;
a pinion coupled to said shaft;
a gear coupled to said lead screw and in communication with said pinion; and
a spring pulling said gear and said pinion together.

45. An apparatus according to claim 44, wherein said first alignment assembly includes:
a lead pad mounted on said lead screw, wherein said lead pad includes a contact with a spherical surface.

46. An apparatus according to claim 45, wherein said optics mounting assembly includes a first extension arm in communication with said lead pad and said first extension arm includes a groove for receiving said contact.

47. An apparatus according to claim 1, wherein:
said pivot socket has a spherical surface; and
said optics mounting assembly has at least one support member resting on said spherical surface.

48. An apparatus according to claim 47, wherein:
said optics mounting assembly includes a reflector adapted to receive an input light beam and supply an output light beam; and
said output light beam originates from a location on said reflector located at a center of a sphere including said spherical surface.

49. An apparatus according to claim 48, wherein said reflector is a penta-prism.

50. An apparatus according to claim 48, wherein said reflector is partially transmissive.

51. An apparatus according to claim 47, wherein a center of a sphere including said spherical surface is a center of rotation for said optical mounting assembly.

52. An apparatus according to claim 51, wherein:
said at least one alignment assembly includes a first alignment assembly and a second alignment assembly; and
said optics mounting assembly includes a first arm in communication with said first alignment assembly and a second arm in communication with said second alignment assembly.

53. An apparatus according to claim 52, wherein force applied to said first arm by said first alignment assembly causes said optics mounting assembly to pivot about said center of said sphere.

54. An apparatus according to claim 53, wherein force applied to said second arm by said second alignment assembly causes said optics mounting assembly to pivot about said center of said sphere.

55. An apparatus according to claim 1, wherein said optics mounting assembly includes:
a shaft; and
a reflector mounted on said shaft.

56. An apparatus according to claim 55, wherein said optics mounting assembly includes a rotation mount, wherein said shaft is coupled to said rotation mount and rotation of said rotation mount causes said shaft to rotate, and said apparatus further includes:
a first cap coupled to said rotation mount, wherein rotation of said first cap causes rotation of said rotation mount; and
a second cap having a spring controlled wheel assembly adapted to transfer rotational motion of said second cap to said first cap without transferring translational motion of said second cap to said first cap.

57. An apparatus according to claim 56, wherein said optics mounting assembly includes a light source adapted to provide a light beam incident on said reflector, wherein said apparatus further includes:
a control subsystem adapted to decrease an intensity of said light beam from said light source in response to a rotation of said first cap.

58. An apparatus according to claim 56, wherein said second cap includes a spring controlled wheel assembly.

59. An apparatus according to claim 58, wherein said spring controlled wheel assembly includes:
a first axel;
a first wheel mounted on said first axel; and
at least one first flexible member supporting said first axel.

60. An apparatus according to claim 59, wherein said second cap includes at least one first groove for receiving said first axel, when a force directs said second cap towards said first cap.

61. An apparatus according to claim 60, wherein friction between said first wheel and said first cap causes rotation of said second cap to cause rotation of said first cap to follow rotation of said second cap when said first wheel is received in said first groove and is in contact with said first cap.

62. An apparatus according to claim 55, wherein said optics mounting assembly includes:
a light source aligned to provide a light beam incident on said reflector;
a motor mechanism in communication with said shaft and adapted to rotate said shaft.

63. An apparatus according to claim 62, further including:
a control subsystem having at least one controller readable storage medium having controller readable code embodied on said at least one controller readable storage medium, said controller readable code for programming said at least one controller to perform a method including the steps of:
(h) directing said motor mechanism to rotate said shaft.

64. An apparatus according to claim 63, wherein said step (h) includes the step of:
(1) directing said motor mechanism to dither said shaft between two positions.

65. An apparatus according to claim 63, wherein said step (h) includes the step of:
(2) directing said motor mechanism to repeatedly rotate said shaft through complete revolutions.

66. An apparatus according to claim 63, wherein said step (h) includes the step of:
(3) directing said motor mechanism to rotate said shaft from a first position to a second position, wherein rotation of said shaft from said first position to said second position is less than a complete revolution of said shaft.

67. An apparatus according to claim 63, wherein said motor mechanism includes:
a motor having a motor shaft;
a belt drive gear coupled to said motor shaft;
a support ring coupled to said shaft in said optics mounting assembly; and
a belt in communication with said belt drive gear and said support ring.

68. An apparatus comprising:
a pivot socket;
an optics mounting assembly extending through said pivot socket, wherein said optics mounting assembly includes a first arm and a second arm;
a first spring system in communication with said optics mounting assembly, wherein said first spring system directs said optics mounting assembly through said pivot socket;
a first alignment assembly in communication with said first arm;
a second alignment assembly in communication with said second arm;
a first spring biasing said first arm to abut said first alignment assembly; and
a second spring biasing said second arm to abut said second alignment assembly.

69. An apparatus according to claim 68, wherein said first arm is perpendicular to said second arm.

70. An apparatus according to claim 68, wherein:
said first alignment assembly includes a first pad in communication with said first arm, and
said second alignment assembly includes a second pad in communication with said second arm.

71. An apparatus according to claim 70, wherein:
said first spring biases said first arm to abut said first pad, and
said second spring biases said second arm to abut said second pad.

72. An apparatus according to claim 71, wherein:
said first spring is mounted to a first lead nut in communication with said first pad, and
said second spring is mounted to a second lead nut in communication with said second pad.

73. An apparatus according to claim 72, wherein said first spring is in communication with said first arm and said second spring is in communication with said second arm.

74. An apparatus according to claim 71, wherein said first spring is a leaf spring and said second spring is a leaf spring.

75. An apparatus according to claim 68, wherein said first spring system applies a force to said optics mounting assembly along an axis through said pivot socket.

76. An apparatus according to claim 75, wherein said axis is perpendicular to a cross section of an opening in said pivot socket, wherein said optics mounting assembly passes through said opening.

77. An apparatus according to claim 68, wherein said first spring system includes a first set of springs, wherein each spring in said first spring system is coupled to said pivot socket and said optics mounting assembly.

78. An apparatus according to claim 77, wherein said first spring system consists of 3 springs.

79. An apparatus according to claim 77, wherein:

said pivot socket includes a set of locations, each spring in said first spring system is coupled to said pivot socket at a location in said set of locations, and locations in said set of locations are equally spaced apart.

80. An apparatus according to claim 68, wherein said pivot socket has a spherical surface.

81. An apparatus according to claim 68, wherein:

said pivot socket has a spherical surface, said optics mounting assembly has at least one support member resting on said spherical surface, said optics mounting assembly includes a reflector adapted to receive an input light beam and supply an output light beam, and said output light beam originates from a location on said reflector located at a center of a sphere including said spherical surface.

82. An apparatus according to claim 81, wherein a center of a sphere including said spherical surface is a center of rotation for said optical mounting assembly.

83. An apparatus according to claim 81, wherein:

force applied to said first arm by said first alignment assembly causes said optics mounting assembly to pivot about said center of said sphere, and force applied to said second arm by said second alignment assembly causes said optics mounting assembly to pivot about said center of said sphere.

84. An apparatus comprising:

a pivot socket;

an optics mounting assembly extending through said pivot socket, wherein said optics mounting assembly includes a first arm and a second arm;

a plurality of springs directing said optics mounting assembly through said pivot socket, wherein each spring in said plurality of springs is coupled to said optics mounting assembly and said pivot socket;

a first alignment assembly in communication with said first arm;

a second alignment assembly in communication with said second arm;

a first spring in communication with said first arm to bias said first arm to abut said first alignment assembly; and a second spring in communication with said second arm to bias said second arm to abut said second alignment assembly.

85. An apparatus according to claim 84, wherein:

said first plurality of springs applies a force to said optics mounting assembly along an axis through said pivot socket, and said axis is perpendicular to a cross section of an opening in said pivot socket, wherein said optics mounting assembly passes through said opening.

86. An apparatus according to claim 84, wherein:

said first alignment assembly includes a first pad in communication with said first arm, said second alignment assembly includes a second pad in communication with said second arm, said first spring biases said first arm to abut said first pad, and said second spring biases said second arm to abut said second pad.

87. An apparatus according to claim 86, wherein:

said first spring is mounted to a first lead nut in communication with said first pad, and said second spring is mounted to second lead nut in communication with said second pad.

88. An apparatus according to claim 87, wherein said first spring is a leaf spring and said second spring is a leaf spring.

89. An apparatus according to claim 84, wherein said plurality of springs consists of 3 springs.

90. An apparatus according to claim 84, wherein:

said pivot socket includes a set of locations, each spring in said plurality of springs is coupled to said pivot socket at a location in said set of locations, and locations in said set of locations are equally spaced apart.

91. An apparatus according to claim 84, wherein said pivot socket has a spherical surface.

92. An apparatus according to claim 84, wherein:

said pivot socket has a spherical surface, said optics mounting assembly has at least one support member resting on said spherical surface, said optics mounting assembly includes a reflector adapted to receive an input light beam and supply an output light beam, and said output light beam originates from a location on said reflector located at a center of a sphere including said spherical surface.

93. An apparatus according to claim 92, wherein a center of a sphere including said spherical surface is a center of rotation for said optical mounting assembly.

94. An apparatus according to claim 93, wherein:

force applied to said first arm by said first alignment assembly causes said optics mounting assembly to pivot about said center of said sphere, and force applied to said second arm by said second alignment assembly causes said optics mounting assembly to pivot about said center of said sphere.

* * * * *